United States Patent
Chen et al.

(10) Patent No.: US 10,588,124 B2
(45) Date of Patent: Mar. 10, 2020

(54) METHOD AND APPARATUS FOR SOLVING MISMATCH BETWEEN SIDELINK BUFFER STATUS REPORT (BSR) AND AVAILABLE SIDELINK TRANSMISSION IN A WIRELESS COMMUNICATION SYSTEM

(71) Applicant: ASUSTeK Computer Inc., Taipei (TW)

(72) Inventors: Wei-Yu Chen, Taipei (TW); Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 209 days.

(21) Appl. No.: 15/270,539

(22) Filed: Sep. 20, 2016

(65) Prior Publication Data

US 2017/0094656 A1 Mar. 30, 2017

Related U.S. Application Data

(60) Provisional application No. 62/232,820, filed on Sep. 25, 2015.

(51) Int. Cl.
*H04W 72/04* (2009.01)
*H04W 76/14* (2018.01)
(Continued)

(52) U.S. Cl.
CPC ....... *H04W 72/0446* (2013.01); *H04W 76/14* (2018.02); *H04W 4/023* (2013.01);
(Continued)

(58) Field of Classification Search
CPC . H04W 72/0446; H04W 76/14; H04W 76/15; H04W 72/1289; H04W 88/04;
(Continued)

(56) References Cited

U.S. PATENT DOCUMENTS

| 2016/0080969 A1* | 3/2016 | Tseng | H04W 4/70 370/329 |
| 2016/0192427 A1* | 6/2016 | Yun | H04L 12/189 370/329 |

(Continued)

OTHER PUBLICATIONS

"3rd Generation Partnership Project; Technical Specification Group Services and System Aspects; Proximity-based services (ProSe); Stage 2 (Release 13)", 3GPP Standard; 3GPP TS 23.303, 3rd Generation Partnership Project (3GPP), Mobile Competence Centre ; 650, Route Des Lucioles ; F-06921 Sophia-Antipolis Cedex ; France, vol. SA WG2, No. V13.1.0, Sep. 15, 2015 (Sep. 15, 2015), pp. 1-116, XP050996002.

(Continued)

*Primary Examiner* — Ivan O Latorre
(74) *Attorney, Agent, or Firm* — Blue Capital Law Firm, P.C.

(57) ABSTRACT

A method and apparatus for triggering solving mismatch between sidelink BSR and available sidelink transmission in a wireless communication system are disclosed. In one embodiment, the method includes a relay UE establishing a first layer-2 link and a second layer-2 link between the relay UE and a remote UE, wherein the first layer-2 link and the second layer-2 link have two different source identities and a same destination identity. The method further includes the relay UE receiving a sidelink grant from an eNB. The method further includes the relay UE using the sidelink grant to serve the first layer-2 link and the second layer-2 link.

18 Claims, 27 Drawing Sheets

(51) Int. Cl.
    *H04W 8/00*     (2009.01)
    *H04W 88/04*     (2009.01)
    *H04W 72/12*     (2009.01)
    *H04W 76/15*     (2018.01)
    *H04W 4/02*     (2018.01)
    *H04W 80/02*     (2009.01)
    *H04W 84/04*     (2009.01)

(52) U.S. Cl.
    CPC ........ *H04W 8/005* (2013.01); *H04W 72/1289* (2013.01); *H04W 76/15* (2018.02); *H04W 80/02* (2013.01); *H04W 84/042* (2013.01); *H04W 88/04* (2013.01)

(58) Field of Classification Search
    CPC ... H04W 80/02; H04W 4/023; H04W 84/042; H04W 8/005
    See application file for complete search history.

(56) References Cited

U.S. PATENT DOCUMENTS

| | | | |
|---|---|---|---|
| 2017/0215187 A1* | 7/2017 | Panteleev | H04W 72/1278 |
| 2017/0245292 A1* | 8/2017 | Agiwal | H04W 28/02 |
| 2017/0303307 A1* | 10/2017 | Xu | H04W 76/14 |
| 2017/0359835 A1* | 12/2017 | Seo | H04B 7/14 |
| 2018/0054755 A1* | 2/2018 | Lee | H04W 72/1284 |
| 2018/0084481 A1* | 3/2018 | Wang | H04W 40/22 |
| 2018/0092017 A1* | 3/2018 | Freda | H04W 76/14 |
| 2018/0139724 A1* | 5/2018 | Loehr | H04W 72/02 |
| 2018/0146494 A1* | 5/2018 | Khoryaev | H04W 76/14 |
| 2018/0213508 A1* | 7/2018 | Chai | H04W 72/04 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP Standard; 3GPP TS 36.321, 3rd Generation Partnership Project (3GPP), Mobile Competence Centre ; 650, Route Des Lucioles ; F-06921 Sophia- Antipolis Cedex ; France, vol. RAN WG2, No. V12.7.0, Sep. 24, 2015 (Sep. 24, 2015), pp. 1-77, XP050996302.

European Search Report from corresponding European Patent Application No. 16189637.8, dated Jan. 19, 2017.

\* cited by examiner

| Group index₁ | LCG ID₁ | Buffer Size₁ | Oct 1 |
| Buffer Size₁ | Group index₂ | | Oct 2 |
| LCG ID₂ | Buffer Size₂ | | Oct 3 |

...

| Group index$_{N-1}$ | LCG ID$_{N-1}$ | Buffer Size$_{N-1}$ | Oct 1.5*N-2 |
| Buffer Size$_{N-1}$ | Group index$_N$ | | Oct 1.5*N-1 |
| LCG ID$_N$ | Buffer Size$_N$ | | Oct 1.5*N |

FIG. 12 (PRIOR ART)

| Group index₁ | LCG ID₁ | Buffer Size₁ | Oct 1 |
| Buffer Size₁ | Group index₂ | | Oct 2 |
| LCG ID₂ | Buffer Size₂ | | Oct 3 |

...

| Group index$_N$ | LCG ID$_N$ | Buffer Size$_N$ | | | Oct 1.5*N-0.5 |
| Buffer Size$_N$ | R | R | R | R | Oct 1.5*N+0.5 |

FIG. 13 (PRIOR ART)

R/R/E/LCID sub-header

US 10,588,124 B2

METHOD AND APPARATUS FOR SOLVING MISMATCH BETWEEN SIDELINK BUFFER STATUS REPORT (BSR) AND AVAILABLE SIDELINK TRANSMISSION IN A WIRELESS COMMUNICATION SYSTEM

CROSS-REFERENCE TO RELATED APPLICATIONS

The present application claims the benefit of U.S. Provisional Patent Application Ser. No. 62/232,820 filed on Sep. 25, 2015, the entire disclosure of which is incorporated herein in their entirety by reference.

FIELD

This disclosure generally relates to wireless communication networks, and more particularly, to a method and apparatus for triggering solving mismatch between sidelink BSR and available sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus for triggering solving mismatch between sidelink BSR and available sidelink transmission in a wireless communication system are disclosed. In one embodiment, the method includes a relay UE (User Equipment) establishing a first layer-2 link and a second layer-2 link between the relay UE and a remote UE, wherein the first layer-2 link and the second layer-2 link have two different source identities and a same destination identity. The method further includes the relay UE receiving a sidelink grant from an eNB (evolved Node B). The method further includes the relay UE using the sidelink grant to serve the first layer-2 link and the second layer-2 link.

In another embodiment, the method includes a relay UE sending a sidelink assistance message containing an information of a first layer-2 link and an information of a second layer-2 link to an eNB for associating each group index field in a sidelink BSR with one layer-2 link, wherein the first layer-2 link and the second layer-2 link established between the relay UE and a remote UE have two different source identities and a same destination identity. The method further includes the relay UE sending the sidelink BSR to the eNB, wherein resource demands for data of the first layer-2 link and data of the second layer-2 link are reported in different buffer size fields of the sidelink BSR.

BRIEF DESCRIPTION OF THE DRAWINGS

FIG. 12 is a reproduction of Figure 6.1.3.1a-1 of 3GPP TS 36.321 v12.6.0.

FIG. 13 is a reproduction of Figure 6.1.3.1a-2 of 3GPP TS 36.321 v12.6.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. and METIS Deliverable D2.4, "Proposed solutions for new radio access". Furthermore, the exemplary wireless communication systems devices described below may be designed to support one or more standards such as the standard offered by a consortium named "3rd Generation Partnership Project" referred to herein as 3GPP, including: TS 23.303 v13.0.0, "Proximity-based services (ProSe)"; TR 23.713 v1.6.0, "Study on extended architecture enhancements to support for proximity-based services"; TS 36.331 v12.6.0, "E-UTRAN Radio Resource Control (RRC) Protocol specification"; and TS 36.321 v12.6.0, "E-UTRAN Medium Access Control (MAC) Protocol specification". The standards and documents listed above are hereby expressly incorporated by reference in their entirety.

Figure 1:
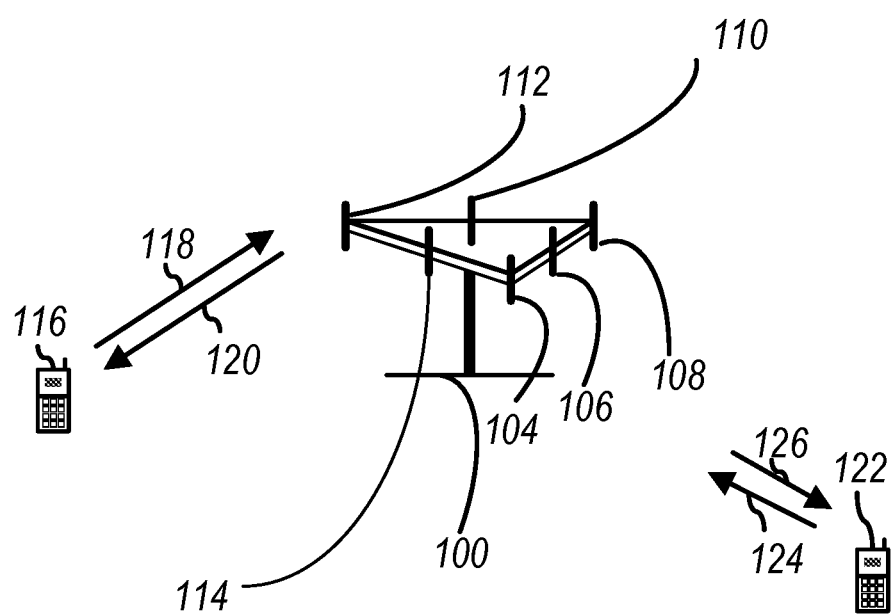
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
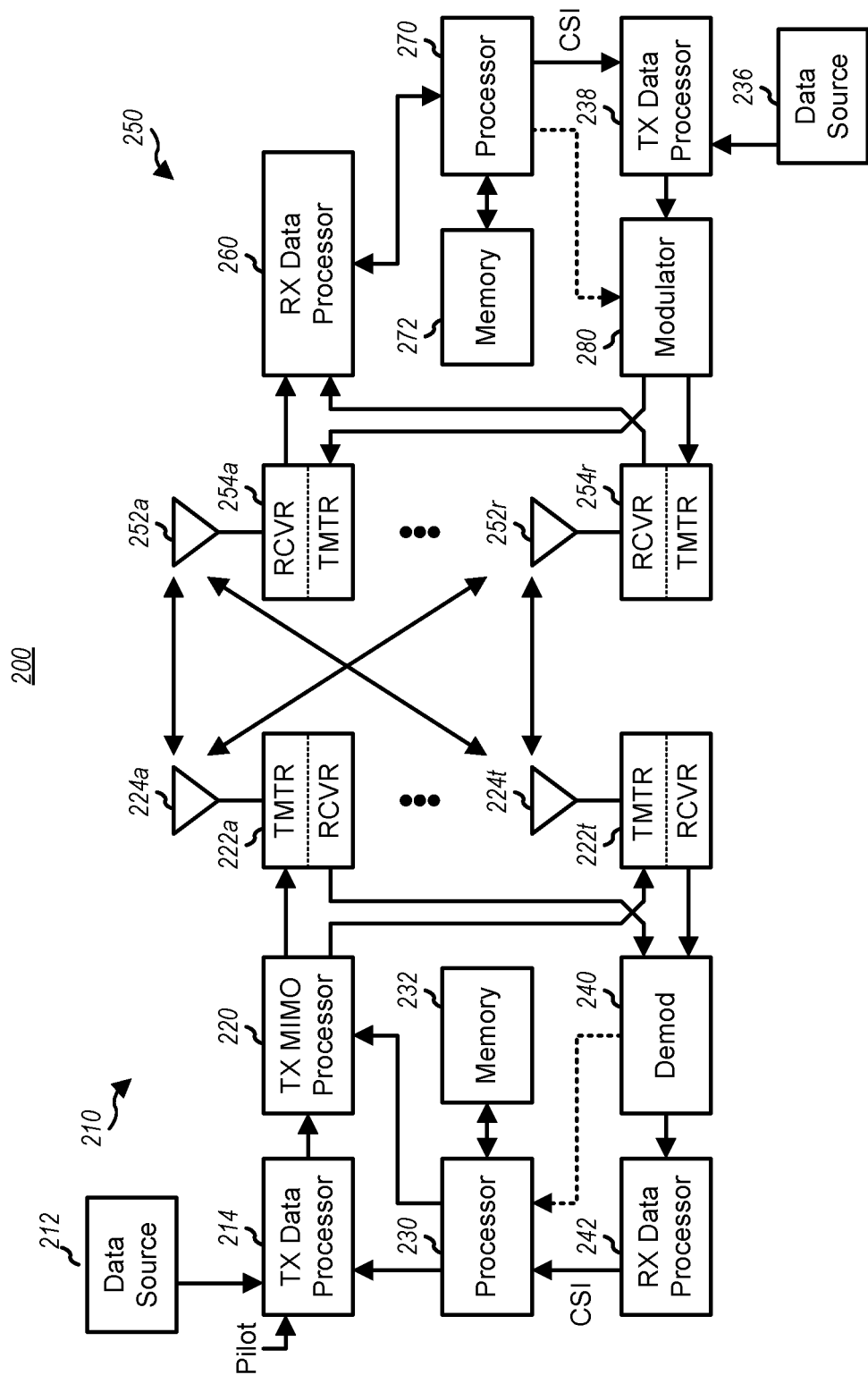
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
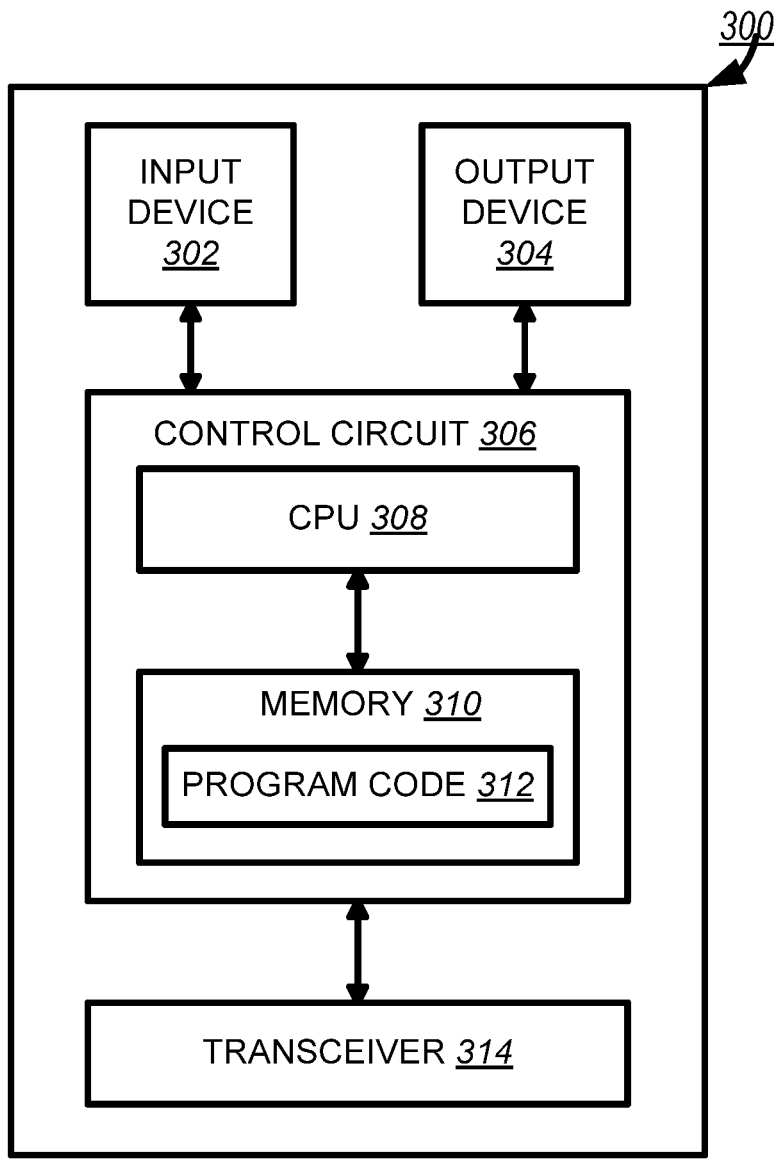
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
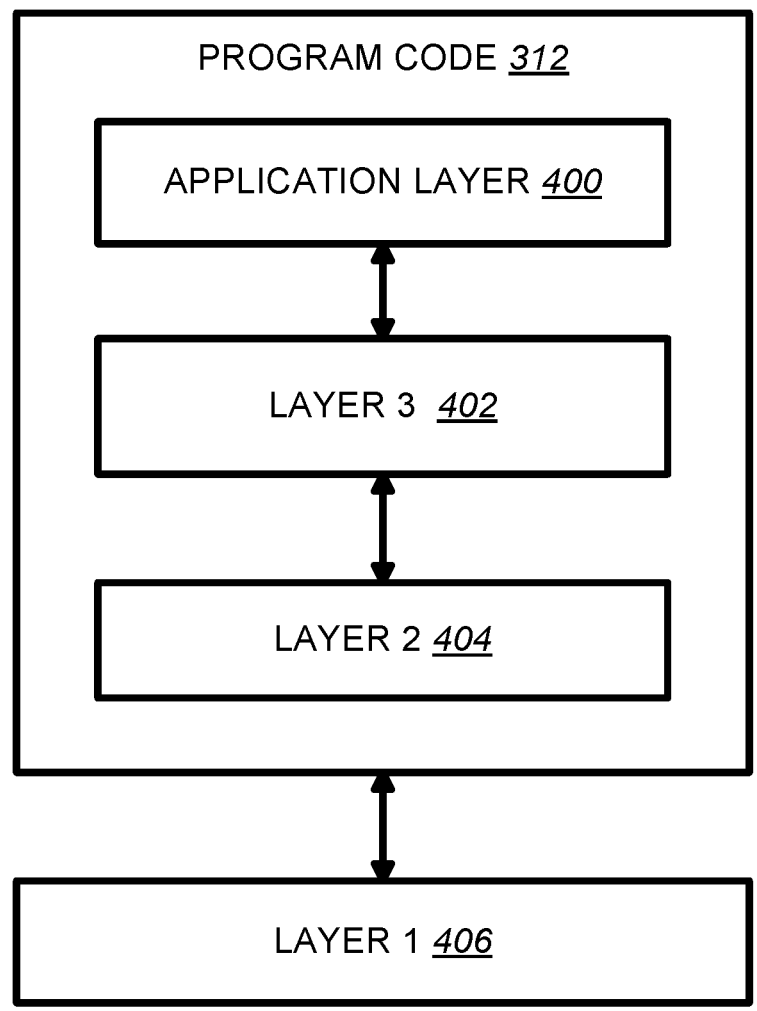
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.303 v13.0.0 describes a Proximity-based Service (ProSe) UE-to-Network Relay as follows:
4.4.3 ProSe UE-to-Network Relay The ProSe UE-to-Network Relay entity provides the functionality to support connectivity to "unicast" services for Remote UEs that are not "served by E-UTRAN" (see figure 4.4.3-1).

Figure 5:
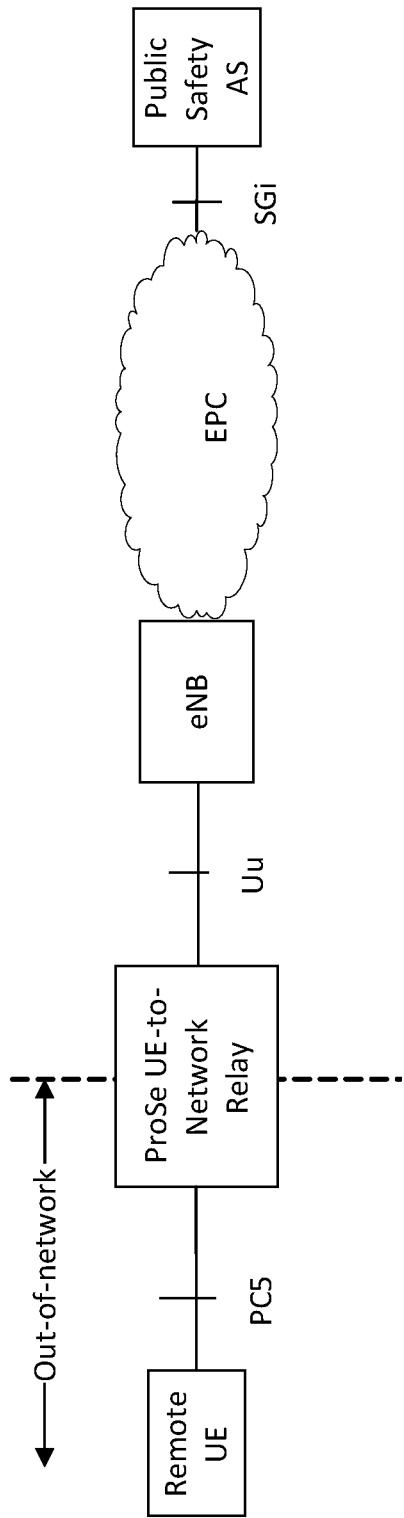
FIG. 5 is a reproduction of Figure 4.4.3-1 of 3GPP TS 23.303 v13.0.0.

[Figure 4.4.3-1 of 3GPP TS 23.303 v13.0.0 is reproduced as FIG. 5] The ProSe UE-to-Network Relay shall relay unicast traffic (UL and DL) between the Remote UE and the network. The ProSe UE-to-Network Relay shall provide generic function that can relay any type of traffic that is relevant for public safety communication.

NOTE 1: There is no support for relaying eMBMS traffic from Uu interface to PC5 in this release of the specification.

NOTE 2: The IP Address preservation is not supported when the Remote UE moves out of the ProSe UE-to-Network Relay coverage.

One-to-one Direct Communication between Remote UEs and ProSe UE-to-Network Relays has the following characteristics:

Communication over PC5 reference point is connectionless.

ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

4.5.4 ProSe UE-to-Network Relaying

ProSe UE-to-Network Relaying shall include the following functions:

ProSe Direct discovery following Model A or Model B can be used in order to allow the Remote UE to discover ProSe UE-to-Network Relay(s) in proximity.

ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.

Act as an "announcing" or "discoveree" UE on the PC5 reference point supporting direct discovery.

Act as a default router to the Remote UEs forwarding IP packets between the UE-ProSe UE-to-Network Relay point-to-point link and the corresponding PDN connection.

Handle Router Solicitation and Router Advertisement messages as defined in IETF RFC 4861[10].

Act as DHCPv4 Server and stateless DHCPv6 Relay Agent.

Act as a NAT if IPv4 is used replacing the locally assigned IPv4 address of the Remote UE with its own.

Map the L2 link ID used by the Remote UE as Destination Layer-2 ID to the corresponding PDN connection supported by the ProSe UE-to-Network Relay.

NOTE: The aspects of the radio layers for the PC5 reference point are defined in RAN specifications.

Figure 6:
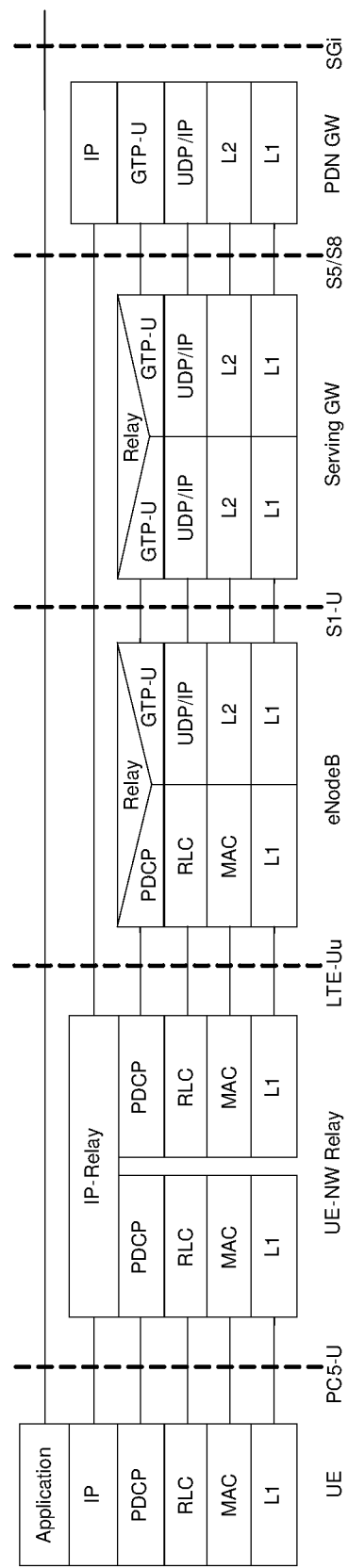
FIG. 6 is a reproduction of Figure 5.1.2.2-1 of 3GPP TS 23.303 v13.0.0.

3GPP TS-23.303 v13.0.0 also specifies the user plane for UE—UE-to-Network Relay as follows:

[Figure 5.1.2.2-1 of 3GPP TS 23.303 v13.0.0 is reproduced as FIG. 6]

Legend:

GPRS Tunneling Protocol for the user plane (GTP-U): This protocol tunnels user data between eNodeB and the S-GW as well as between the S-GW and the P-GW in the backbone network. GTP shall encapsulate all end user IP packets.

MME controls the user plane tunnel establishment and establishes User Plane Bearers between eNodeB and S-GW.

UDP/IP: These are the backbone network protocols used for routing user data and control signalling.

LTE-Uu: The radio protocols of E-UTRAN between the UE and the eNodeB are not specified in TS 36.300 [17].

PC5-U: The radio protocols of E-UTRAN between the UE and the UE-to-Network Relay are specified in this Release.

Editor's Note: Access Stratum stack to be reviewed and finally decided in RAN WGs.

In 3GPP TS-23.303 v13.0.0, it is noted that for supporting multiple PDN Connections, the ProSe UE-to-Network Relay is assigned with a different ProSe Relay UE ID for each PDN Connection. In particular, 3GPP TS-23.303 v13.0.0 states:

4.5.4 ProSe UE-to-Network Relaying

ProSe UE-to-Network Relaying shall include the following functions:

- ProSe Direct discovery following Model A or Model B can be used in order to allow the Remote UE to discover ProSe UE-to-Network Relay(s) in proximity.
- ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.
- Act as an "announcing" or "discoveree" UE on the PC5 reference point supporting direct discovery.
- Act as a default router to the Remote UEs forwarding IP packets between the UE-ProSe UE-to-Network Relay point-to-point link and the corresponding PDN connection.
- Handle Router Solicitation and Router Advertisement messages as defined in IETF RFC 4861[10].
- Act as DHCPv4 Server and stateless DHCPv6 Relay Agent.
- Act as a NAT if IPv4 is used replacing the locally assigned IPv4 address of the Remote UE with its own.
- Map the L2 link ID used by the Remote UE as Destination Layer-2 ID to the corresponding PDN connection supported by the ProSe UE-to-Network Relay.

NOTE: The aspects of the radio layers for the PC5 reference point are defined in RAN specifications.

[ . . . ]

4.6.3.1 ProSe UE ID

This is a link layer identifier that is used as a source Layer-2 ID in all the packets the UE sends for one-to-many ProSe Direct Communication.

When bearer-level security is configured to be used, the ProSe UE ID is assigned by the ProSe Key Management Function as defined in TS 33.303 [29]. The ProSe Key Management Function ensures that the ProSe UE ID is unique in the context of one-to-many ProSe Direct Communication for this group.

When bearer-level security is configured not to be used (including the case of Layer-2 broadcast communication required to support Dynamic Configuration of IPv4 Link-Local Addresses IETF RFC 3927 [16]), the ProSe UE ID is either configured in the UE or self-assigned by the UE. Assuming that global uniqueness of ProSe UE ID cannot be ensured, the UE should be prepared to handle conflicts of ProSe UE IDs using mechanisms that are out of scope of this release of the specification (e.g. by self-assigning a new ProSe UE ID when a conflict is detected).

For support of multiple PDN Connections, the ProSe UE-to-Network Relay is assigned a different ProSe UE ID for each PDN Connection.

[ . . . ]

4.6.4.3 Identifiers for ProSe UE-to-Network Relay Discovery and Selection

The following information may be used for ProSe UE-to-Network Relay discovery and selection:

- Message type identifier (e.g. identifying Model A or Model B discovery)
- ProSe Relay (UE) ID: link layer identifier that is used for direct communication and is associated with a PDN connection the ProSe UE-to-Network Relay has established.
- PLMN ID: this identifies the PLMN to which radio frequencies used on the link to the Remote UE belong. If these radio frequencies are shared between multiple PLMNs, or not allocated to any PLMN, then the choice of PLMN ID is configured by the HPLMN.
- ProSe Application Relay Code: parameter identifying connectivity the ProSe UE-to-Network Relay provides. (e.g. including APN information).
- Whether the UE can act as a relay.
- Status/maintenance flags (e.g. indicating whether the relay is temporarily without connectivity or battery running low so the Remote UEs can seek/reselect another Relay). Editor's note: It is FFS if additional parameters are needed in order to protect the discovery message (e.g. restricted discovery).

In 3GPP TR 23.713 v1.6.0, the layer-2 link establishment procedure discussed in Sections 7.1.2.1 and 7.2.2.1 describes that UE-1 sends a Direct Communication Request message to UE-2 to establish a layer-2 link over PC5 interface after the relay discovery procedure successfully finished. Furthermore, the Layer-2 ID of UE-2 is used as a Destination Layer-2 ID for transmitting the Direct Communication Request message. Moreover, the layer-2 ID of the Relay UE will be unique for each PDN connection. Furthermore, 3GPP TR 23.713 v1.6.0 states:

The following parameters are common to all of UE-to-Network Relay Discovery, Group Member Discovery and UE-to-UE Relay Discovery:

- Message type: Announcement (Model A) or Solicitation/Response (Model B), Relay Discovery Additional Information (Model A).
- Discovery type: indicates whether this is UE-to-Network Relay Discovery, Group Member Discovery or UE-to-UE Relay Discovery.

The following parameters are used in the UE-to-Network Relay Discovery Announcement message (Model A):

- ProSe Relay UE ID: link layer identifier that is used for direct communication and is associated with a Relay Service Code.
- Announcer info: provides information about the announcing user.
- Relay Service Code: parameter identifying a connectivity service the ProSe UE-to-Network Relay provides to Public Safety applications. The Relay Service Codes are configured in a ProSe UE-to-Network relay for advertisement. Additionally, the Relay Service Code also identifies authorized users the ProSe UE-to-Network relay would offer service to, and may select the related security policies or information e.g. necessary for authentication and authorization between the Remote UE and the ProSe UE-to-Network Relay (e.g. a Relay Service Code for relays for police members only would be different than a Relay Service code for relays for Fire Fighters only, even though potentially they provided connectivity to same APN e.g. to support Internet Access). The definition of values of the Relay Service Code are out of scope of ProSe specification.
- Radio Layer Information: contains information about the radio layer information, e.g. radio conditions between the eNB and the UE-to-Network Relay, to assist the Remote UE selecting the proper UE-to-Network Relay.

Figure 7:
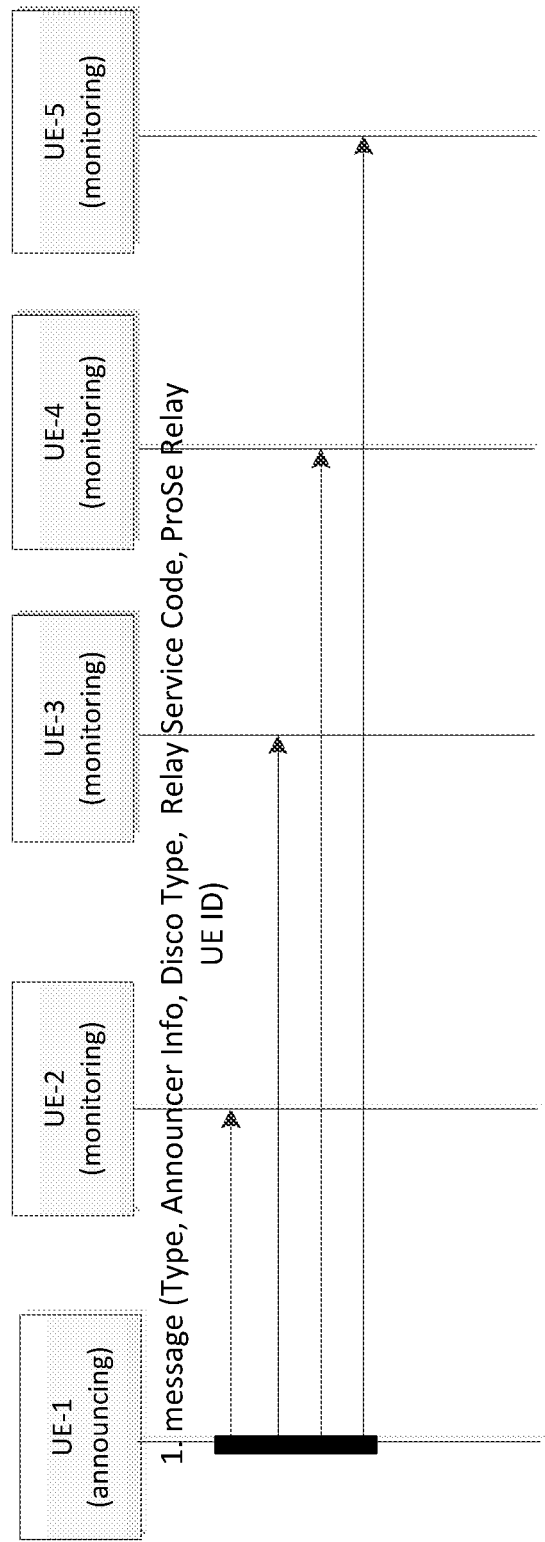
FIG. 7 is a reproduction of Figure 6.1.2.2.1.1 of 3GPP TR 23.713 v1.6.0.
Figure 8:
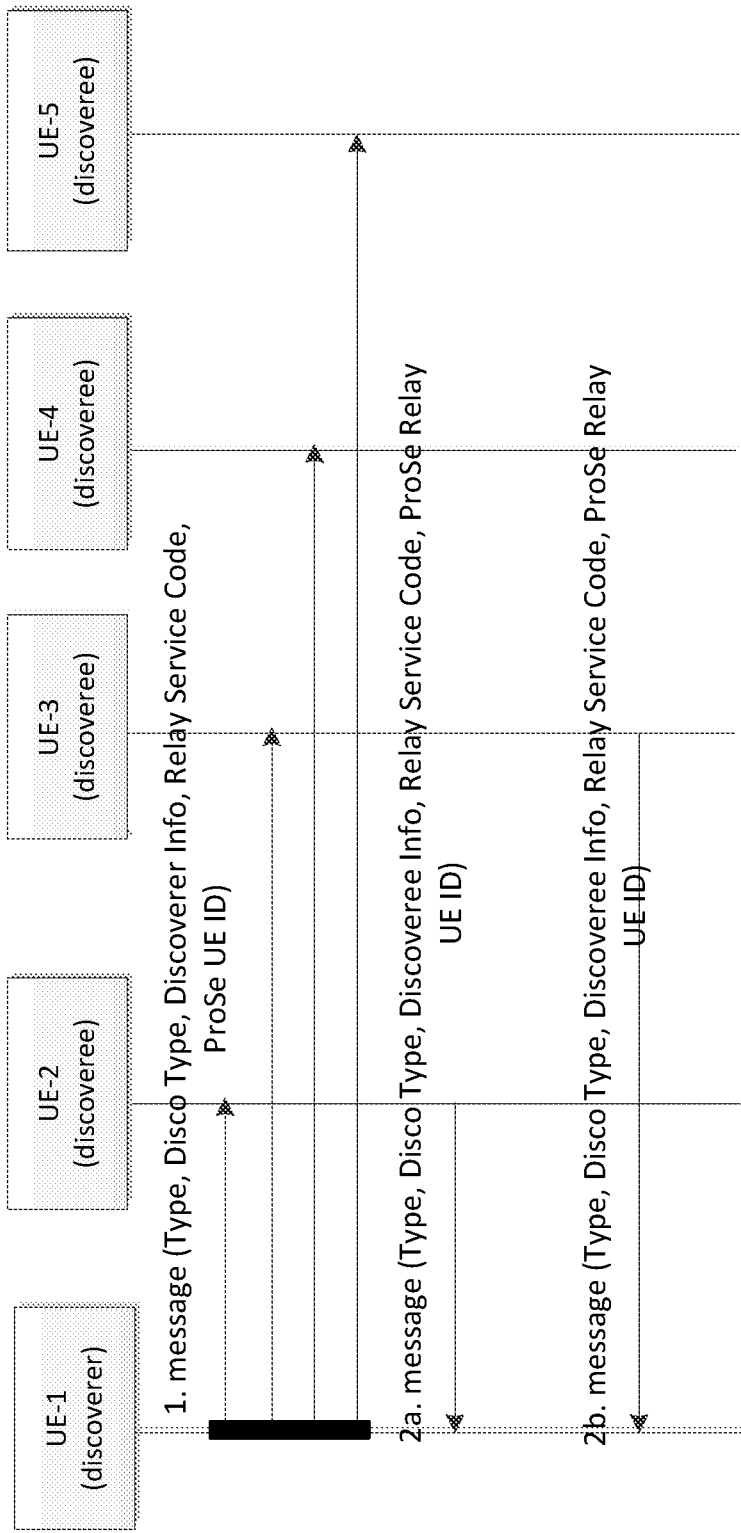
FIG. 8 is a reproduction of Figure 6.1.2.2.2.1 of 3GPP TR 23.713 v1.6.0.
Figure 9:
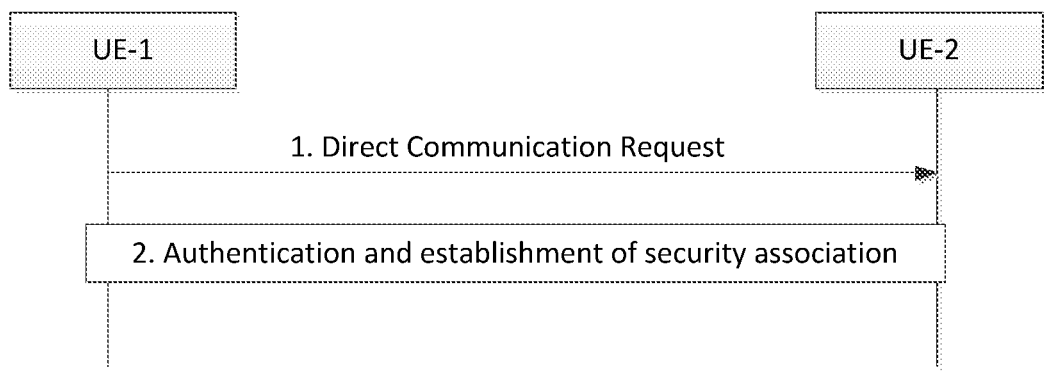
FIG. 9 is a reproduction of Figure 7.1.2.1.1 of 3GPP TR 23.713 v1.6.0.
Figure 10:
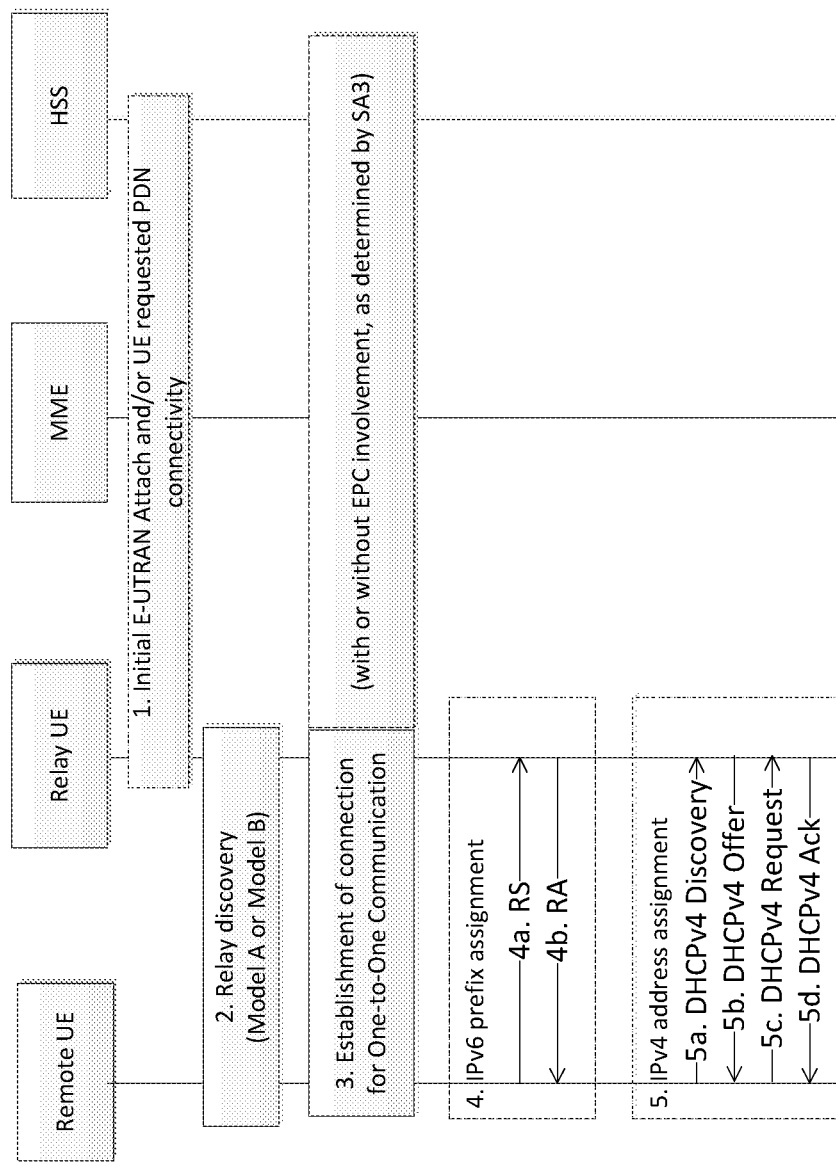
FIG. 10 is a reproduction of Figure 7.2.2.1 of 3GPP TR 23.713 v1.6.0.

Editor's Note: The details of Radio Layer Information parameters are to be identified and if agreed then to be defined by RAN WGs.
NOTE 1: A ProSe Relay UE ID should be uniquely associated with a Relay Service Code.
NOTE 2: ProSe Relay UE ID in the announcement message does not imply that the ProSe UE-to-Network Relay has established the indicated connectivity to the network.
The following parameters are used in the UE-to-Network Relay Discovery Solicitation message (Model B):
  Discoverer info: provides information about the discoverer user.
  Relay Service Code: information about connectivity that the discoverer UE is interested in. The Relay Service Codes are configured in the Prose Remote UEs interested in related connectivity services.
The following parameters are used in the UE-to-Network Relay Discovery Response message (Model B):
  ProSe Relay UE ID: link layer identifier that is used for direct communication and is associated with a Relay Service Code.
NOTE 3: It is up to stage 3 specifications how the ProSe UE-to-Network Relay indicates in the response message which Relay Service Code it can support.
NOTE 4: a ProSe Relay UE ID should be uniquely associated with a Relay Service Code.
NOTE 5: ProSe Relay UE ID in the response message does not imply that the ProSe UE-to-Network Relay has established the indicated connectivity to the network.
  Discoveree info: provides information about the discoveree.
  Radio Layer Information: contains information about the radio layer information, e.g. radio conditions between the eNB and the UE-to-Network Relay, to assist the Remote UE selecting the proper UE-to-Network Relay.
Editor's Note: The details of Radio Layer Information parameters are to be identified and if agreed then to be defined by RAN WGs.
[ . . . ]
6.1.2.2 UE-Network Relay discovery
6.1.2.2.1 Model A
Depicted in figure 6.1.2.2.1.1 is the procedure for Relay discovery Model A.
  [Figure 6.1.2.2.1.1 of 3GPP TR 23.713 v1.6.0 is reproduced as FIG. 7]
  Step 1:
  Type=Announcement
  Discovery Type=UE-NW Relay Discovery
6.1.2.2.2 Model B
Depicted in figure 6.1.2.2.2.1 is the procedure for Relay discovery Model B.
  [Figure 6.1.2.2.2.1 of 3GPP TR 23.713 v1.6.0 is reproduced as FIG. 8]
  Step 1:
  Type=Solicitation
  Discovery Type=UE-NW Relay Discovery
  Step 2:
  Type=Response
  Discovery Type=UE-NW Relay Discovery
[ . . . ]
7.1.2.1 Establishment of Secure Layer-2 Link Over PC5
Depicted in figure 7.1.2.1.1 is the procedure for establishment of secure layer-2 link over PC5. The message includes the User Info-1 parameter that is used to assert the identity of the UE-1's user. UEs engaged in isolated (non-relay) one to one communication may negotiate the link-local address to be used for subsequent communication.
  [Figure 7.1.2.1.1 of 3GPP TR 23.713 v1.6.0 is reproduced as FIG. 9]
1. UE-1 sends a Direct Communication Request message to UE-2 in order to trigger mutual authentication. If link local address is used, UE 1 includes the configured link-local address in the Direct Communication Request message. UE 1 may include both an IPv4 address and an IPv6 address in the message to facilitate that UE 2 can choose the address of the IP version it supports,
NOTE 1: The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.
NOTE 2: "Secure layer-2 link" implies at least mutual authentication between the two users. Whether bearer level confidentiality or integrity protection over PC5 is mandatory or not is in SA3 scope.
2. UE-2 initiates the procedure for mutual authentication. As part of this step UE-2 includes the User Info-2 parameter that is used to assert the identity of the UE-2's user. The successful completion of the authentication procedure indicates the establishment of the secure layer-2 link over PC5. UE 2 checks whether it supports the link local address of IP version indicated in step 1. If it supports, UE 2 responds a Direct Communication Response (link-local address of UE 2) message.
Editor's note: It is FFS whether User Info parameter used in this procedure is the same as the Announcer/Discoverer/Discoveree Info parameter used in the Public Safety Discovery procedures. It depends on the asserted identity that will be defined in the security procedures in SA3.
[ . . . ]
7.2.2.1 Relay Discovery and One-to-One Communication Establishment
The ProSe UE-Network Relay may attach to the network (if not already attached) and establish a PDN connection that can be used for relaying of traffic to/from Remote UEs.
  [Figure 7.2.2.1 of 3GPP TR 23.713 v1.6.0 is reproduced as FIG. 10]
1. The ProSe UE-Network Relay performs initial E-UTRAN Attach (if not already attached) and/or establishes a PDN connection for relaying (if no appropriate PDN connection for this relaying exists). In case of IPv6, the ProSe UE-Network Relay obtains IPv6 prefix via prefix delegation function from the network as defined in TS 23.401 [7].
2. The Remote UE performs discovery of a ProSe UE-Network Relay using Model A or Model B discovery. The details of this procedure are described in clause 6.
3. The Remote UE selects a ProSe UE-Network Relay and establishes a connection for One-to-One Communication. The details of this procedure are described in clause 7.1.
NOTE 1: Whether the authentication of the Remote UE involves the EPC will be decided by SA WG3.
4. When IPv6 is used on PC5 the Remote UE performs IPv6 Stateless Address auto-configuration, the Remote UE shall send a Router Solicitation message (step 4a) to the network using as Destination Layer-2 ID the Layer-2 ID of the Relay in order to solicit a Router Advertisement message (step 4b) as specified in IETF RFC 4862 [6]. The Router Advertisement messages shall contain the assigned IPv6 prefix. After the Remote UE receives the Router Advertisement message, it constructs a full IPv6 address via IPv6 Stateless Address auto-configuration in accordance with IETF RFC 4862 [6]. However, the Remote UE shall not use any identifiers defined in TS 23.003 [8] as the basis for generating the interface identifier. For privacy, the Remote UE may change the interface identifier used to generate the full IPv6 address, as defined in TS 23.221 [9] without involving the network. The Remote UE shall use the auto-configured IPv6 address while sending packets.

5. When IPv4 is used on PC5 the Remote UE uses DHCPv4 [10]. The Remote UE shall send DHCPv4 Discovery (step 5a) message using as Destination Layer-2 ID the Layer-2 ID of the Relay. The ProSe UE-Network Relay acting as a DHCPv4 Server sends the DHCPv4 Offer (step 5b) with the assigned Remote UE IPv4 address. When the Remote UE receives the lease offer, it sends a DHCP REQUEST message containing the received IPv4 address (step 5c). The ProSe UE-Network Relay acting as DHCPv4 server sends a DHCPACK message to the Remote UE (step 5d) including the lease duration and any other configuration information that the client might have requested. On receiving the DHCPACK message, the Remote UE completes the TCP/IP configuration process.

NOTE 2: The DHCPv4 client may skip the DHCPv4 Discovery phase, and send DHCPv4 Request message in broadcast as the first message in accordance with the DHCPv4 renewal process.

3GPP TS 36.331 v12.6.0 describes the details about conditions for a UE to transmit SidelinkUEInformation and the content in SidelinkUEInformation. Moreover, regarding the content of SidelinkUEInformation for sidelink communication, the destinationInfoList is for an eNB to associate group indexes used in sidelink BSR with corresponding destinations. More specifically, 3GPP TS 36.331 v12.6.0 states:

5.10.2 Sidelink UE Information
5.10.2.1 General

Figure 11:
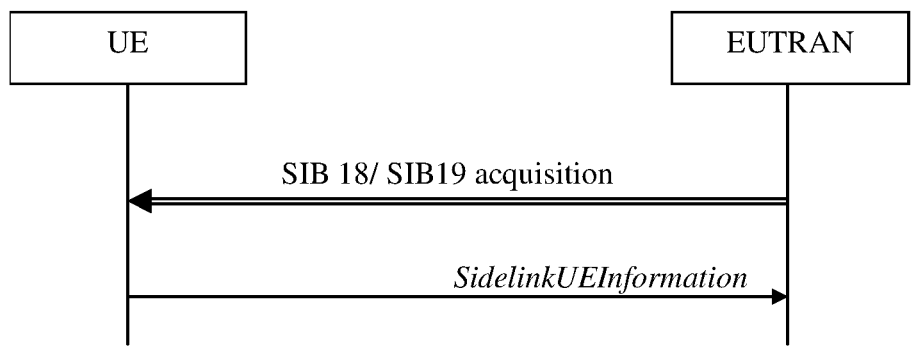
FIG. 11 is a reproduction of Figure 5.10.2-1 of 3GPP TS 36.331 v12.6.0.

[Figure 5.10.2-1 of 3GPP TS 36.331 v12.6.0 is reproduced as FIG. 11]

The purpose of this procedure is to inform E-UTRAN that the UE is interested or no longer interested to receive sidelink direct communication or discovery, as well as to request assignment or release of transmission resources for sidelink direct communication or discovery announcements.

5.10.2.2 Initiation

A UE capable of sidelink direct communication or discovery that is in RRC_CONNECTED may initiate the procedure to indicate it is (interested in) receiving sidelink direct communication or discovery in several cases including upon successful connection establishment, upon change of interest, upon change to a PCell broadcasting SystemInformationBlockType18 or SystemInformationBlockType19. A UE capable of sidelink direct communication or discovery may initiate the procedure to request assignment of dedicated resources for the concerned sidelink direct communication transmission or discovery announcements.

NOTE 1: A UE in RRC_IDLE that is configured to transmit sidelink direct communication/discovery announcements, while SystemInformationBlockType18/SystemInformationBlockType19 does not include the resources for transmission (in normal conditions), initiates connection establishment in accordance with 5.3.3.1a.

Upon initiating the procedure, the UE shall:
1> if SystemInformationBlockType18 is broadcast by the PCell:
  2> ensure having a valid version of SystemInformationBlockType18 for the PCell;
  2> if configured by upper layers to receive sidelink direct communication:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType18; or NOTE 2: After handover/re-establishment from a source PCell not broadcasting SystemInformationBlockType18 the UE repeats the same interest information that it provided previously as such a source PCell may not forward the interest information.

3> if the last transmission of the SidelinkUEInformation message did not include commRxInterestedFreq; or if the frequency configured by upper layers to receive sidelink direct communication on has changed since the last transmission of the SidelinkUEInformation message:
      4> initiate transmission of the SidelinkUEInformation message to indicate the sidelink direct communication reception frequency of interest in accordance with 5.10.2.3;
  2> else:
    3> if the last transmission of the SidelinkUEInformation message included commRxInterestedFreq:
      4> initiate transmission of the SidelinkUEInformation message to indicate it is no longer interested in sidelink direct communication reception in accordance with 5.10.2.3;
  2> if configured by upper layers to transmit sidelink direct communication:
    3> if the UE did not transmit a SidelinkUEInformation message since entering RRC_CONNECTED state; or
    3> if since the last time the UE transmitted a SidelinkUEInformation message the UE connected to a PCell not broadcasting SystemInformationBlockType18; or
    3> if the last transmission of the SidelinkUEInformation message did not include commTxResourceReq; or if the information carried by the commTxResourceReq has changed since the last transmission of the SidelinkUEInformation message:
      4> initiate transmission of the SidelinkUEInformation message to indicate the sidelink direct communication transmission resources required by the UE in accordance with 5.10.2.3;
  2> else:
    3> if the last transmission of the SidelinkUEInformation message included commTxResourceReq:
      4> initiate transmission of the SidelinkUEInformation message to indicate it does no longer require sidelink direct communication transmission resources in accordance with 5.10.2.3;
1> if SystemInformationBlockType19 is broadcast by the PCell:
  2> ensure having a valid version of SystemInformationBlockType19 for the PCell;
  2> if configured by upper layers to receive sidelink direct discovery announcements on a serving frequency or on one or more frequencies included in discInterFreqList, if included in SystemInformationBlockType19:
    3> if the UE did not transmit a SidelinkUEInformation message since last entering RRC_CONNECTED state; or 3> if since the last time the UE transmitted a SidelinkUEInformation message the UE connected to a PCell not broadcasting SystemInformationBlockType19; or 3> if the last transmission of the SidelinkUEInformation message did not include discRxInterest:

4> initiate transmission of the SidelinkUEInformation message to indicate it is interested in sidelink direct discovery reception in accordance with 5.10.2.3;

2> else:

3> if the last transmission of the SidelinkUEInformation message included discRxInterest:

4> initiate transmission of the SidelinkUEInformation message to indicate it is no longer interested in sidelink direct discovery reception in accordance with 5.10.2.3;

2> if the UE is configured by upper layers to transmit sidelink direct discovery announcements:

3> if the UE did not transmit a SidelinkUEInformation message since entering RRC_CONNECTED state; or 3> if since the last time the UE transmitted a SidelinkUEInformation message the UE connected to a PCell not broadcasting SystemInformationBlockType19; or 3> if the last transmission of the SidelinkUEInformation message did not include discTxResourceReq; or if the direct discovery announcement resources required by the UE have changed (i.e. resulting in a change of discTxResourceReq) since the last transmission of the SidelinkUEInformation message:

4> initiate transmission of the SidelinkUEInformation message to indicate the sidelink direct discovery announcement resources required by the UE in accordance with 5.10.2.3;

2> else:

3> if the last transmission of the SidelinkUEInformation message included discTxResourceReq:

4> initiate transmission of the SidelinkUEInformation message to indicate it does no longer require sidelink direct discovery announcement resources in accordance with 5.10.2.3;

5.10.2.3 Actions Related to Transmission of SidelinkUEInformation Message

The UE shall set the contents of the SidelinkUEInformation message as follows:

1> if SystemInformationBlockType18 is broadcast by the PCell:

2> if configured by upper layers to receive sidelink direct communication:

3> include commRxInterestedFreq and set it to the sidelink direct communication frequency;

2> if configured by upper layers to transmit sidelink direct communication:

3> include commTxResourceReq and set its fields as follows:

4> set carrierFreq to indicate the sidelink direct communication frequency i.e. the same value as indicated in commRxInterestedFreq if included;

4> set destinationInfoList to include the sidelink direct communication transmission destination(s) for which it requests E-UTRAN to assign dedicated resources;

1> if SystemInformationBlockType19 is broadcast by the PCell:

2> if configured by upper layers to receive sidelink direct discovery announcements on a serving frequency or one or more frequencies included in discInterFreqList, if included in SystemInformationBlockType19:

3> include discRxInterest;

2> if the UE is configured by upper layers to transmit sidelink direct discovery announcements:

3> include discTxResourceReq and set it to indicate the number of resources for sidelink direct discovery announcement for which it requests E-UTRAN to assign dedicated resources;

The UE shall submit the SidelinkUEInformation message to lower layers for transmission. [ . . . ]

—SidelinkUEInformation

The SidelinkUEInformation message is used for the indication of sidelink information to the eNB.

Signalling radio bearer: SRB1
RLC-SAP: AM
Logical channel: DCCH
Direction: UE to E-UTRAN SidelinkUEInformation Message

```
-- ASN1START
SidelinkUEInformation-r12 ::=      SEQUENCE {
    criticalExtensions             CHOICE {
        c1                             CHOICE {
            sidelinkUEInformation-r12      SidelinkUEInformation-r12-IEs,
            spare3 NULL, spare2 NULL, spare1 NULL
        },
        criticalExtensionsFuture       SEQUENCE { }
    }
}
SidelinkUEInformation-r12-IEs ::=  SEQUENCE {
    commRxInterestedFreq-r12       ARFCN-ValueEUTRA-r9         OPTIONAL,
    commTxResourceReq-r12          SL-CommTxResourceReq-r12    OPTIONAL,
    discRxInterested-r12           ENUMERATED {true}           OPTIONAL,
    discTxResourceReq-r12          INTEGER (1..63)             OPTIONAL,
    lateNonCriticalExtension       OCTET STRING                OPTIONAL,
    nonCriticalExtension           SEQUENCE { }                OPTIONAL
}
SL-CommTxResourceReq-r12 ::=       SEQUENCE {
    carrierFreq-r12                ARFCN-ValueEUTRA-r9         OPTIONAL,
    destinationInfoList-r12        SL-DestinationInfoList-r12
}
```

```
SL-DestinationInfoList-r12 ::=  SEQUENCE (SIZE (1..maxSL-Dest-r12)) OF SL-DestinationIdentity-r12
SL-DestinationIdentity-r12 ::=  BIT STRING (SIZE (24))
-- ASN1STOP
```

| SidelinkUEInformation field descriptions |
|---|
| commRxInterestedFreq<br>Indicates the frequency on which the UE is interested to receive sidelink direct communication.<br>commTxResourceReq<br>Indicates the frequency on which the UE is interested to transmit sidelink direct communication as well as the sidelink direct communication transmission destination(s) for which the UE requests E-UTRAN to assign dedicated resources.<br>destinationInfoList<br>Indicates the destination which is identified by the ProSe Layer-2 Group ID as specified in TS 23.303 [68]. |

According to 3GPP TS 36.321 v12.6.0, the UE reports buffer status for each destination target through sending sidelink BSR to an eNB. In general, the UE may receive a sidelink grant on the PDCCH from the eNB after the UE sends the sidelink BSR. In addition, the UE will use the sidelink grant in next SC period for transmitting SCI and data. Furthermore, the sidelink grant will be used for transmitting data of one source/destination pair indicated in the sub-header of sidelink MAC PDU. The source/destination pair may also be called as source/destination combination or layer-2 link. In particular, 3GPP TS 36.321 v12.6.0 states:

5.14 SL-SCH Data transfer
5.14.1 SL-SCH Data transmission
5.14.1.1 SL Grant reception and SCI transmission
In order to transmit on the SL-SCH the MAC entity must have a sidelink grant. The sidelink grant is selected as follows:
  if the MAC entity is configured to receive a sidelink grant dynamically on the PDCCH and more data is available in STCH than can be transmitted in the current SC period, the MAC entity shall:
    using the received sidelink grant determine the set of subframes in which transmission of SCI and transmission of first transport block occur according to subclause 14.2.1 of [2];
    consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
    clear the configured sidelink grant at the end of the corresponding SC Period;
  else, if the MAC entity is configured by upper layers to transmit using a pool of resources as indicated in subclause 5.10.4 of [8] and more data is available in STCH than can be transmitted in the current SC period and if the MAC entity does not have a configured sidelink grant, the MAC entity shall:
    randomly select the time and frequency resources for SL-SCH and SCI of a sidelink grant from the resource pool configured by upper layers. The random function shall be such that each of the allowed selections [2] can be chosen with equal probability;
    use the selected sidelink grant to determine the set of subframes in which transmission of SCI and transmission of first transport block occur according to subclause 14.2.1 of [2];
    consider the selected sidelink grant to be a configured sidelink grant occurring in those subframes starting at the beginning of the first available SC Period which starts at least 4 subframes after the subframe in which the sidelink grant was selected;
    clear the configured sidelink grant at the end of the corresponding SC Period;
  NOTE: Retransmissions on SL-SCH cannot occur after the configured sidelink grant has been cleared.
The MAC entity shall for each subframe:
  if the MAC entity has a configured sidelink grant occurring in this subframe:
    if the configured sidelink grant corresponds to transmission of SCI:
      instruct the physical layer to transmit SCI corresponding to the configured sidelink grant.
    else if the configured sidelink grant corresponds to transmission of first transport block:
      deliver the configured sidelink grant and the associated HARQ information to the Sidelink HARQ Entity for this subframe.
5.14.1.2 Sidelink HARQ Operation
5.14.1.2.1 Sidelink HARQ Entity
There is one Sidelink HARQ Entity at the MAC entity for transmission on SL-SCH, which maintains one Sidelink process.
For each subframe of the SL-SCH the Sidelink HARQ Entity shall:
  if a sidelink grant has been indicated for the Sidelink process and there is SL data available for transmission:
    obtain the MAC PDU from the "Multiplexing and assembly" entity;
    deliver the MAC PDU and the sidelink grant and the HARQ information to the Sidelink process;
    instruct the Sidelink process to trigger a new transmission.
  else, if this subframe corresponds to retransmission opportunity for the Sidelink process:
    instruct the Sidelink process to trigger a retransmission.
  NOTE: The resources for retransmission opportunities are specified in subclause 14.2.1 of [2].
5.14.1.3 Multiplexing and Assembly
For PDU(s) associated with one SCI, MAC shall consider only logical channels with same Source Layer-2 ID-Destination Layer-2 ID pairs.
5.14.1.3.1 Logical Channel Prioritization
The Logical Channel Prioritization procedure is applied when a new transmission is performed. The UE shall perform the following Logical Channel Prioritization procedure when a new transmission is performed:
  the UE shall allocate resources to the sidelink logical channels according to the following rules:
    the UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximise the transmission of data;

if the MAC entity is given an sidelink grant size that is equal to or larger than 10 bytes while having data available for transmission, the MAC entity shall not transmit only padding.

NOTE: The rules above imply that the order by which the sidelink logical channels are served is left for UE implementation.

[ . . . ]

6.1.3.1a Sidelink BSR MAC Control Elements

Sidelink BSR and Truncated Sidelink BSR MAC control elements consist of one group index field, one LCG ID field and one corresponding Buffer Size field per reported target group. The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2):

Group index: The group index field identifies the ProSe Destination. The length of this field is 4 bits. The value is set to the index of the destination reported in destinationInfoList specified in [8];

LCG ID: The Logical Channel Group ID field identifies the group of logical channel(s) which buffer status is being reported. The length of the field is 2 bits and it is set to "11";

Buffer Size: The Buffer Size field identifies the total amount of data available across all logical channels of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;

R: Reserved bit, set to "0".

[Figure 6.1.3.1a-1 of 3GPP TS 36.321 v12.6.0 is reproduced as FIG. 12]

[Figure 6.1.3.1a-2 of 3GPP TS 36.321 v12.6.0 is reproduced as FIG. 13]

[ . . . ]

6.1.6 MAC PDU (SL-SCH)

A MAC PDU consists of a MAC header, zero or more MAC Service Data Units (MAC SDU), zero, or more MAC control elements, and optionally padding; as described in Figure 6.1.6-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU, a MAC control element or padding.

The SL-SCH subheader consists of the seven header fields V/R/R/R/R/SRC/DST.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

Figure 14:
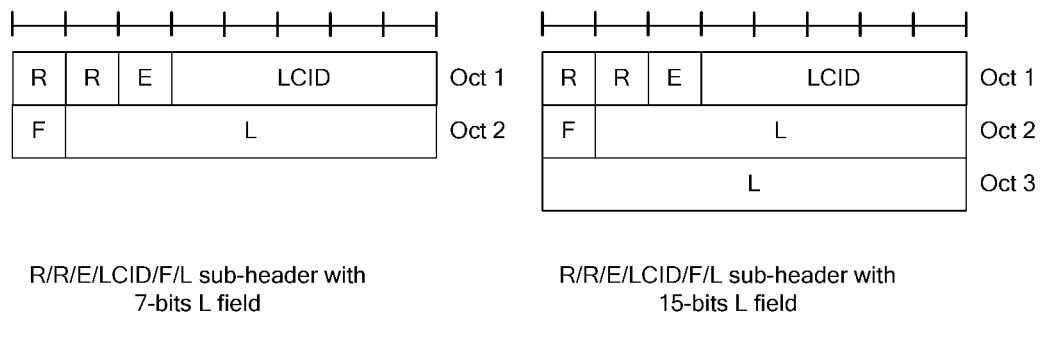
FIG. 14 is a reproduction of Figure 6.1.6-1 of 3GPP TS 36.321 v12.6.0.

[Figure 6.1.6-1 of 3GPP TS 36.321 v12.6.0 is reproduced as FIG. 14]

Figure 15:
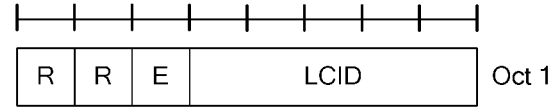
FIG. 15 is a reproduction of Figure 6.1.6-2 of 3GPP TS 36.321 v12.6.0.

[Figure 6.1.6-2 of 3GPP TS 36.321 v12.6.0 is reproduced as FIG. 15]

Figure 16:
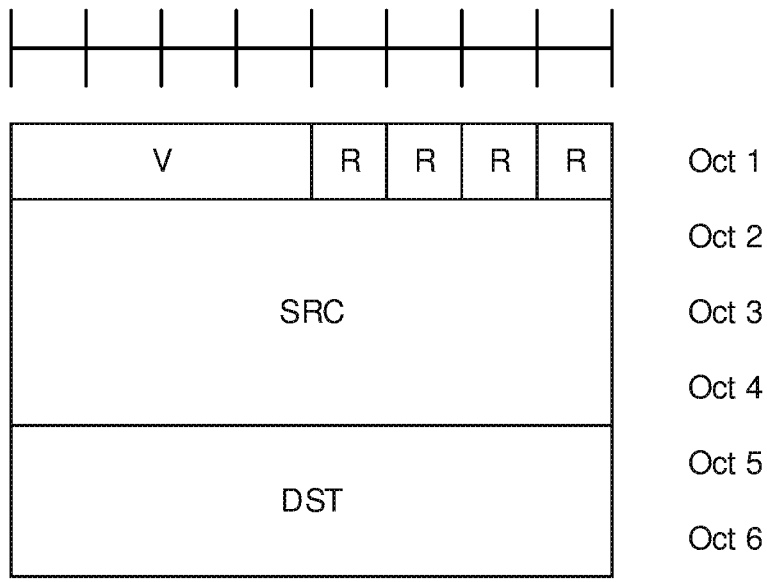
FIG. 16 is a reproduction of Figure 6.1.6-3 of 3GPP TS 36.321 v12.6.0.

[Figure 6.1.6-3 of 3GPP TS 36.321 v12.6.0 is reproduced as FIG. 16]

MAC PDU subheaders have the same order as the corresponding MAC control elements, MAC SDUs and padding.

MAC control elements are always placed before any MAC SDUs.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 17:
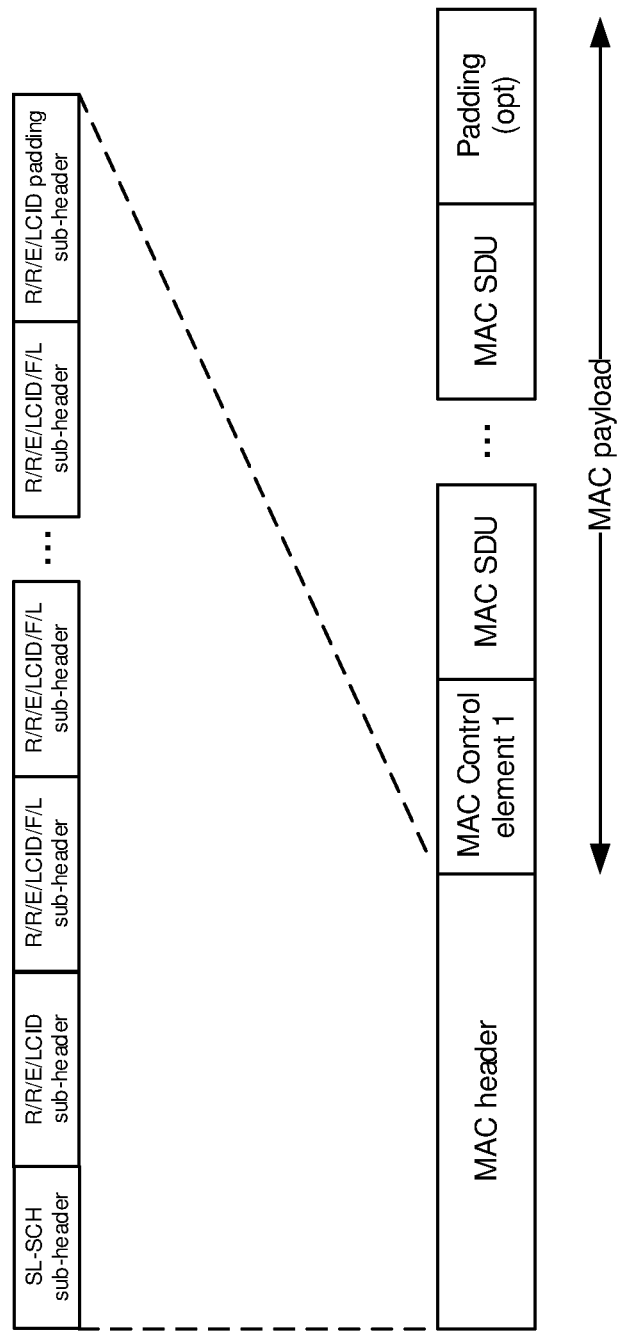
FIG. 17 is a reproduction of Figure 6.1.6-4 of 3GPP TS 36.321 v12.6.0.

[Figure 6.1.6-4 of 3GPP TS 36.321 v12.6.0 is reproduced as FIG. 17]

[ . . . ]

6.2.4 MAC header for SL-SCH

The MAC header is of variable size and consists of the following fields:

V: The MAC PDU format version number field indicates which version of the SL-SCH subheader is used. In this version of the specification only one format version is defined, and this field shall therefore be set to "0001". The V field size is 4 bits;

SRC: The Source Layer-2 ID field carries the identity of the source. It is set to the ProSe UE ID. The SRC field size is 24 bits;

DST: The DST field carries the 16 most significant bits of the Destination Layer-2 ID. The Destination Layer-2 ID is set to the ProSe Layer-2 Group ID;

LCID: The Logical Channel ID field identifies the logical channel instance of the corresponding MAC SDU or the type of the corresponding MAC control element or padding as described in table 6.2.4-1. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits;

L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field;

F: The Format field indicates the size of the Length field as indicated in table 6.2.4-2. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1;

E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;

R: Reserved bit, set to "0".

According to 3GPP TS 23.303 v13.0.0 and TR 23.713 v1.6.0, when a Remote UE wants to establish multiple PDN (Packet Data Network) connections through a Relay UE, the Remote UE needs to perform a layer-2 link establishment procedure for each PDN connection through PC5 interface. Moreover, since each layer-2 link refers to different ProSe Relay UE IDs, the Relay UE could easily understand which PDN connection is required by the Remote UE. On the other hand, because association between each layer-2 link and PDN connection could be differentiated by both the Relay UE and the Remote according to a ProSe Relay UE ID, it is quite reasonable that the Remote UE could use the ProSe Relay UE ID for relaying communications on all layer-2 links.

Regarding transmissions from the Relay UE to the Remote UE on PC5, when the Relay UE is configured with Model, the Relay UE needs to send SL BSR to an eNB for requesting SL (Sidelink) grant to do transmissions. Following 3GPP TS 36.331 v12.6.0 and TS 36.321 v12.6.0, the SL BSR sent by the Relay UE reports buffer status per destination, wherein the destination is the ProSe UE ID of one Remote UE. However, according to 3GPP TS 36.321 v12.6.0, the Relay UE could only use a received SL grant for those data packets belonging to the same pair of source/destination, for instance a combination of ProSe Relay UE ID of the Relay UE and ProSe UE ID of the Remote UE. This is a limitation of the current MAC (Medium Access Control) PDU (Protocol Data Unit) for sidelink defined in 3GPP TS 36.321. For the layer-2 links between the Remote UE and the Relay UE, these layer-2 links may share the same destination. However, the sources (i.e., ProSe Relay UE ID) will be different for each PDN connection. As a result, data packets or MAC SDUs (Service Data Units) for multiple layer-2 links of the same destination cannot be transmitted by using a SL grant.

Figure 18:
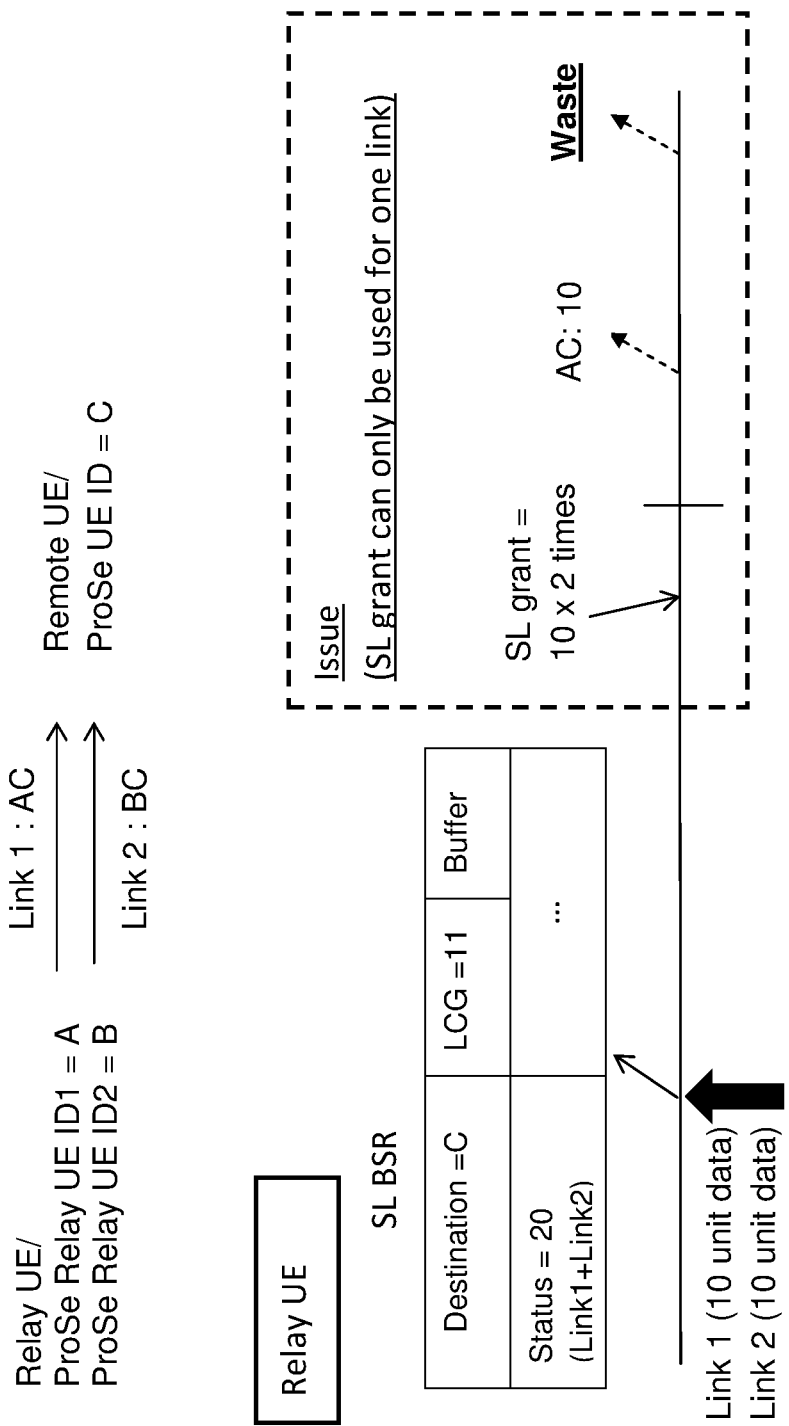
FIG. 18 is a diagram according to one exemplary embodiment.

Given the buffer status may include buffer sizes of multiple source/destination combinations, the eNB may allocate a SL grant with a proper size for satisfying buffer status belonging to a destination (i.e. the Remote UE). However, resources may be wasted since the SL grant could be used for only one of those source/destination combinations. An example of this issue is illustrated in FIG. 18. To solve the mismatch issue, there are two potential directions for solutions.

In general, the first direction (or Direction 1) involves relaxing the above limitation and using an SL grant to transmit data for multiple source/destination combinations. More specifically, those source/destination combinations have the same destination, and belong to the same pair of a Remote UE and a Relay UE. As discussed below, there are two alternatives for the first direction.

Alternative 1 for Direction 1—

Figure 19:
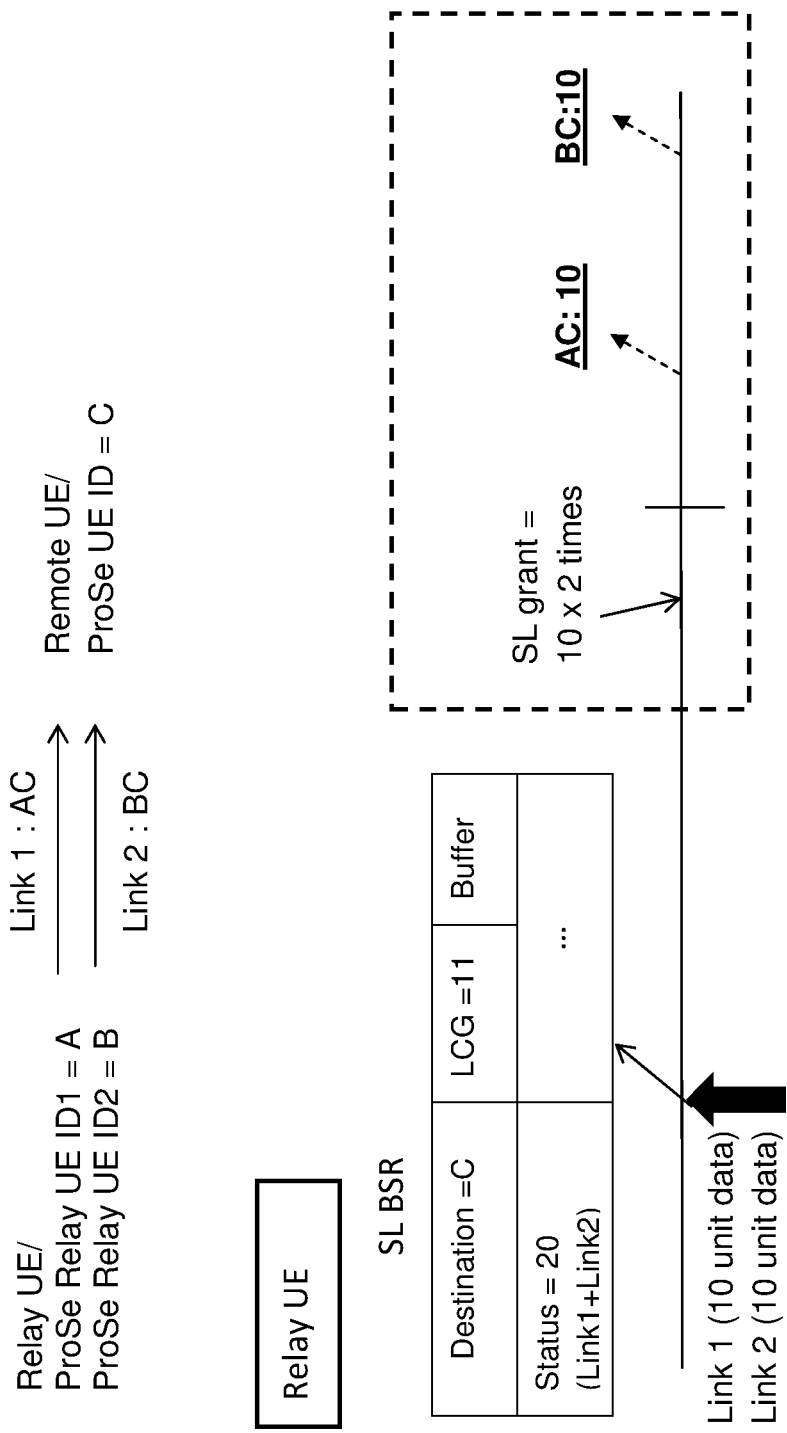
FIG. 19 is a diagram according to one exemplary embodiment.

FIG. 19 illustrates an example of applying Alternative 1 for Direction 1. In principle, a SL grant may map to a set of subframes. The set of subframes may be in a sidelink control (SC) period. The Relay UE can transmit one or more SL MAC PDUs on those subframes belonging to the set of subframes. When the Relay UE uses a received SL grant, the Relay UE will associate the received SL grant with a destination which has data available for transmission. For each transmission of a SL MAC PDU, the Relay UE may select a source/destination combination which has data available for transmission, and creates the SL MAC PDU for the selected source/destination combination, wherein the destination of source/destination combination is the one that the received SL grant is associated with. In particular, the Relay UE may take the highest priority of data available for transmission in each source/destination combination into account for source/destination combination selection. As a result, there may be as many source/destination combinations as the number of configured SL grants being selected for transmissions in one SC period. The number of configured SL grants in one SC period may be configured by the eNB.

Furthermore, regarding the transmissions from the Remote UE to the Relay UE, the destination cannot be completely aligned since the ProSe Relay UE ID is different for each layer-2 link. Therefore, the limitation needs to be further relaxed to facilitate using a SL grant for multiple layer-2 links transmission from the Remote UE to the Relay UE.

The Remote UE needs to associate the received SL grant to part or all ProSe Relay UE IDs of the Relay UE. For each configured SL grant of the SL grant, the Remote UE selects a source/destination combination which has data available for transmission and creates a SL MAC PDU for the source/destination combination for transmission, wherein the destination of source/destination combination belonging to ProSe Relay UE IDs with which the received SL grant is associated. Moreover, to prevent the transmissions being filtered out by sidelink control information (SCI), at least the least significant 8 bits of the associated ProSe Relay UE IDs need to be aligned.

The alignment of the ProSe Relay UE IDs may be done by a PDN server or the ProSe Relay UE. Alternatively, the alignment of the ProSe Relay UE IDs may be done by a procedure between the Relay UE and PDN server.

Figure 20:
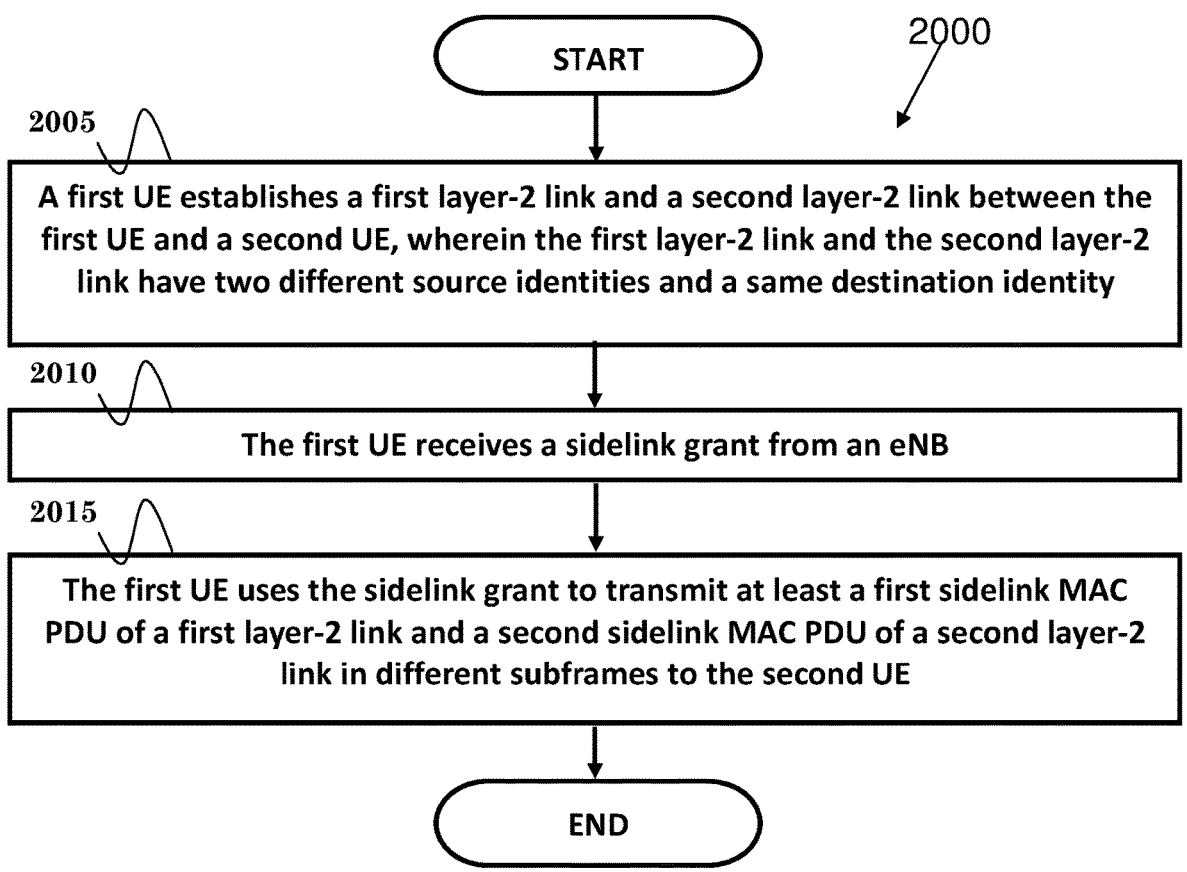
FIG. 20 is a flow chart according to one exemplary embodiment.

FIG. 20 is a flow chart 2000 according to one exemplary embodiment. In step 2005, a first UE (User Equipment) establishes a first layer-2 link and a second layer-2 link between the first UE and a second UE, wherein the first layer-2 link and the second layer-2 link have two different source identities and a same destination identity. In step 2010, the first UE receives a sidelink grant from an eNB (evolved Node B). In one embodiment, the sidelink grant maps to a set of subframes in a sidelink control period.

In step 2015, the first UE uses the sidelink grant to transmit at least a first sidelink MAC PDU of the first layer-2 link and a second sidelink MAC PDU of the second layer-2 link in different subframes to the second UE. In one embodiment, the first sidelink MAC PDU and the second sidelink MAC PDU could use different configured sidelink grants derived from the sidelink grant. Furthermore, a value of SRC (Source) field in the first sidelink MAC PDU could be different from a value of SRC field in the second sidelink MAC PDU. The value of SRC field in the first sidelink MAC PDU could be a first ProSe Relay UE ID of the first UE, and the value of SRC field in the second sidelink MAC PDU could be a second ProSe Relay UE ID of the first UE. In addition, the destination identity of the first layer-2 link and the destination identity of the second layer-2 link could be a ProSe UE Identity of the second UE. Also, the first UE could be a relay UE, and the second UE could be a remote UE. Furthermore, the first layer-2 link and the second layer-2 link could be one-to-one sidelink communications.

In one embodiment, the first UE selects a layer-2 link for using a configured sidelink grant according to a highest priority of data available for transmission for each layer-2 link.

Referring back to FIGS. 3 and 4, in one exemplary embodiment from the perspective of a first UE, the device 300 includes a program code 312 stored in the memory 310. The CPU 308 could execute program code 312 to enable the first UE (i) to establish a first layer-2 link and a second layer-2 link between the first UE and a second UE, wherein the first layer-2 link and the second layer-2 link have two different source identities and a same destination identity, (ii) to receive a sidelink grant from an eNB, and (iii) to use the sidelink grant to transmit at least a first sidelink MAC PDU of the first layer-2 link and a second sidelink MAC PDU of the second layer-2 link in different subframes to the second UE. Furthermore, the CPU 308 can execute the program code 312 to perform all of the above-described actions and steps or others described herein.

Alternative 2 for Direction 1—

Figure 21:
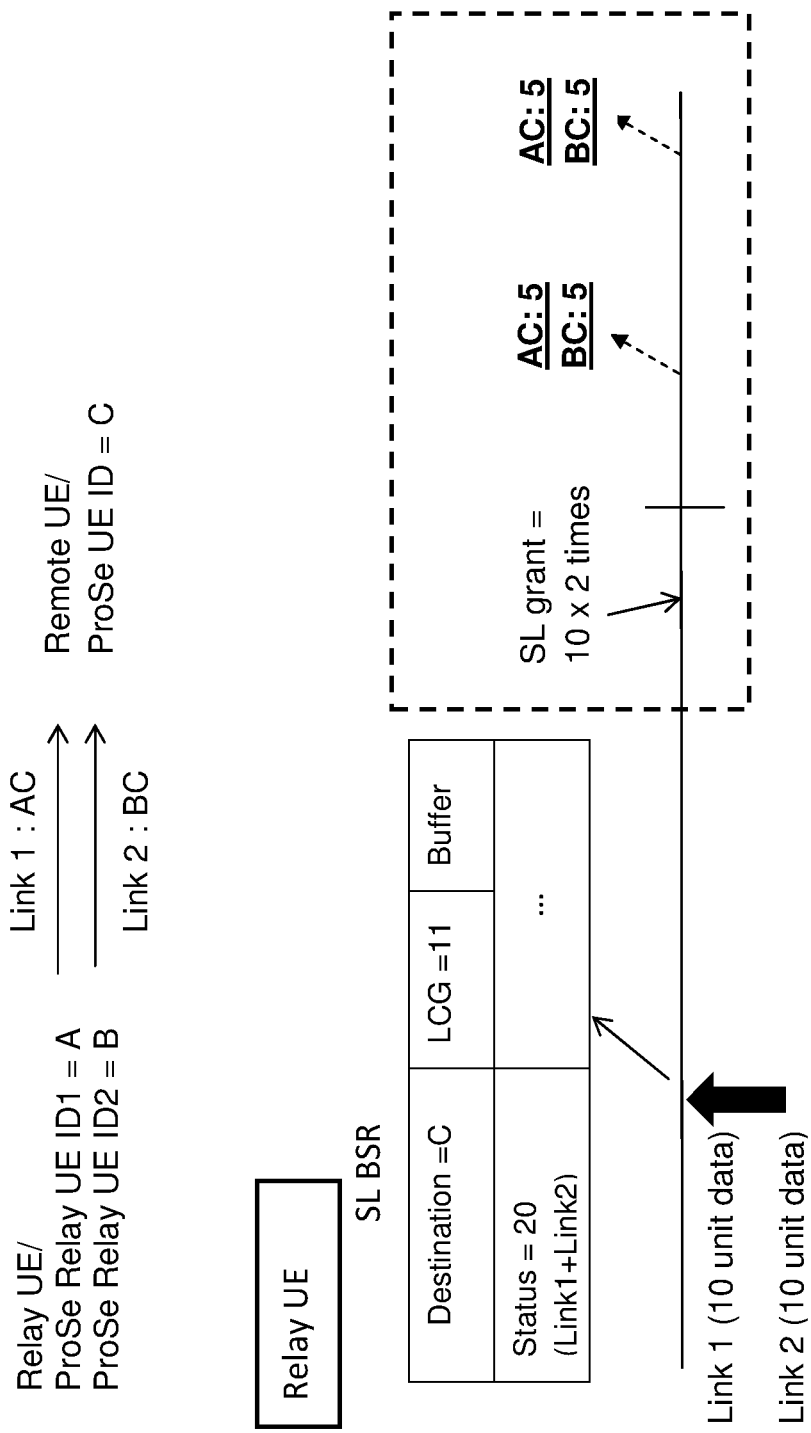
FIG. 21 is a diagram according to one exemplary embodiment.

FIG. 21 illustrates an example of applying Alternative 2 for Direction 1. When the Relay UE uses a received SL grant, the Relay UE needs to associate the received SL grant with a destination which has data available for transmission. The received SL grant may map to a set of subframes. The set of subframes may be in a sidelink control period. The Relay UE can transmit one or more SL MAC PDUs on those subframes belonging to the set of subframes. Each SL MAC PDU to be transmitted in the sidelink control period may contain multiple SL MAC SDUs belonging to different source/destination combinations and those source/destination combinations have the same destination. In particular, the Relay UE may take the highest priority of data available for transmission in a source/destination combination into account for creating the SL MAC PDU. Furthermore, the SL MAC PDU may contain multiple parts and those SL MAC SDUs belonging to the same source/destination combination will be included in a same part of SL MAC PDU.

Moreover, the receiving side could differentiate each part in the SL MAC PDU by SL-SCH (Sidelink Shared Channel) sub-header. In particular, each part of the SL MAC PDU has corresponding SL-SCH sub-header and each SL-SCH sub-header is capable of indicating whether there is another part present in the SL MAC PDU or not.

Figure 22:
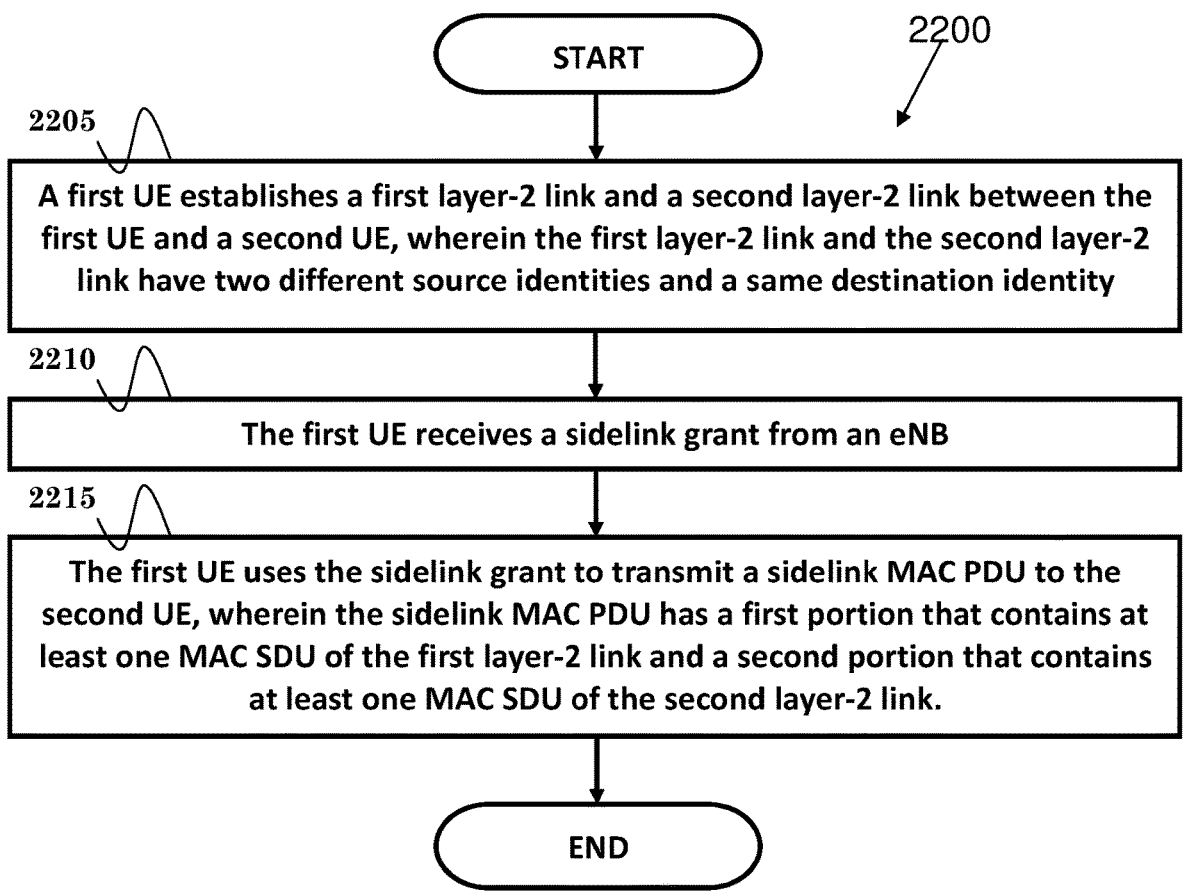
FIG. 22 is a flow chart according to one exemplary embodiment.

FIG. 22 is a flow chart 2200 according to one exemplary embodiment. In step 2205, a first UE (User Equipment) establishes a first layer-2 link and a second layer-2 link between the first UE and a second UE, wherein the first layer-2 link and the second layer-2 link have two different source identities and a same destination identity. In step 2210, the first UE receives a sidelink grant from an eNB. In step 2215, the first UE uses the sidelink grant to transmit a sidelink MAC PDU to the second UE, wherein the sidelink MAC PDU has a first portion that contains at least one MAC SDU of the first layer-2 link and a second portion that contains at least one MAC SDU of the second layer-2 link.

In one embodiment, a first field in a SL-SCH sub-header of the first portion indicates whether the second portion exists or not. Furthermore, a second field in the SL-SCH sub-header of the first portion indicates number of MAC SDU in the first portion. In addition, the first field and the second field could be the same field.

In one embodiment, the first layer-2 link and the second layer-2 link could be different source/destination combinations. Furthermore, the destination identity of the first layer-2 link and the destination identity of the second layer-2 link could be a ProSe UE Identity of the second UE.

In one embodiment, the first UE could be a relay UE, and the second UE could be a remote UE. In addition, the first layer-2 link and the second layer-2 link could be one-to-one sidelink communications.

Referring back to FIGS. 3 and 4, in one exemplary embodiment from the perspective of a first UE, the device 300 includes a program code 312 stored in the memory 310. The CPU 308 could execute program code 312 to enable the first UE (i) to establish a first layer-2 link and a second layer-2 link between the first UE and a second UE, wherein the first layer-2 link and the second layer-2 link have two different source identities and a same destination identity, (ii) to receive a sidelink grant from an eNB, and (iii) to use the sidelink grant to transmit a sidelink MAC PDU to the second UE, wherein the sidelink MAC PDU has a first portion that contains at least one MAC SDU of the first layer-2 link and a second portion that contains at least one MAC SDU of the second layer-2 link. Furthermore, the CPU 308 can execute the program code 312 to perform all of the above-described actions and steps or others described herein.

In general, the second direction (or Direction 2) is to prevent taking data available for transmission in multiple source/destination combinations into account for a buffer size field in a sidelink BSR. As discussed below, there are four alternatives to the second direction.

Alternative 1 for Direction 2—

Figure 23:
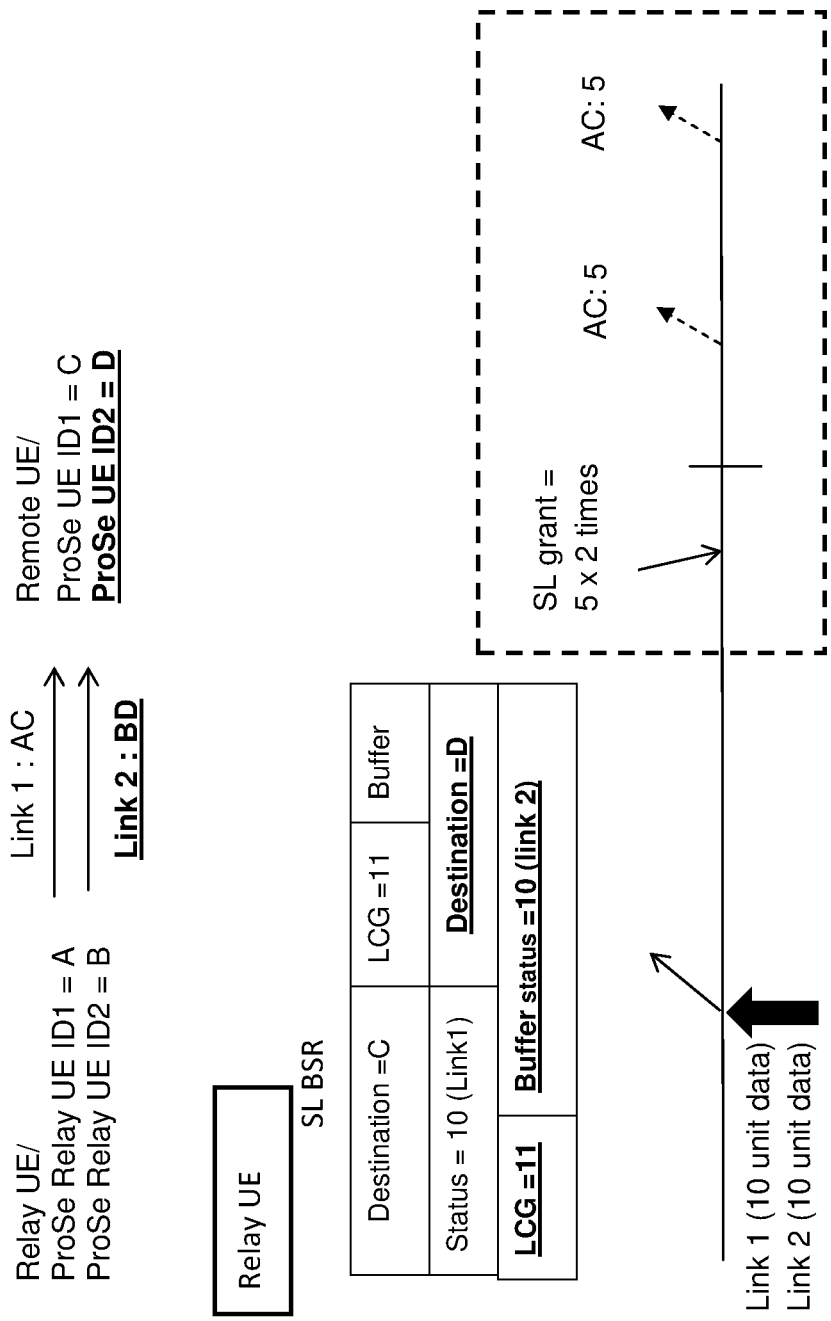
FIG. 23 is a diagram according to one exemplary embodiment.

FIG. 23 illustrates an example of applying Alternative 1 for Direction 2. In this alternative, the Remote UE uses a different ProSe UE ID for each PDN connection so that buffer status of each source/destination combination of the Remote UE can reflected in each SL BSR. In one embodiment, the ProSe UE ID of the Remote UE for each PDN connection is allocated by the PDN server. In an alternative embodiment, the ProSe UE ID of the Remote UE for each PDN connection is decided by the Remote UE itself. In another embodiment, the ProSe UE ID of the Remote UE for each PDN connection is preconfigured in the Remote UE.

Figure 24:
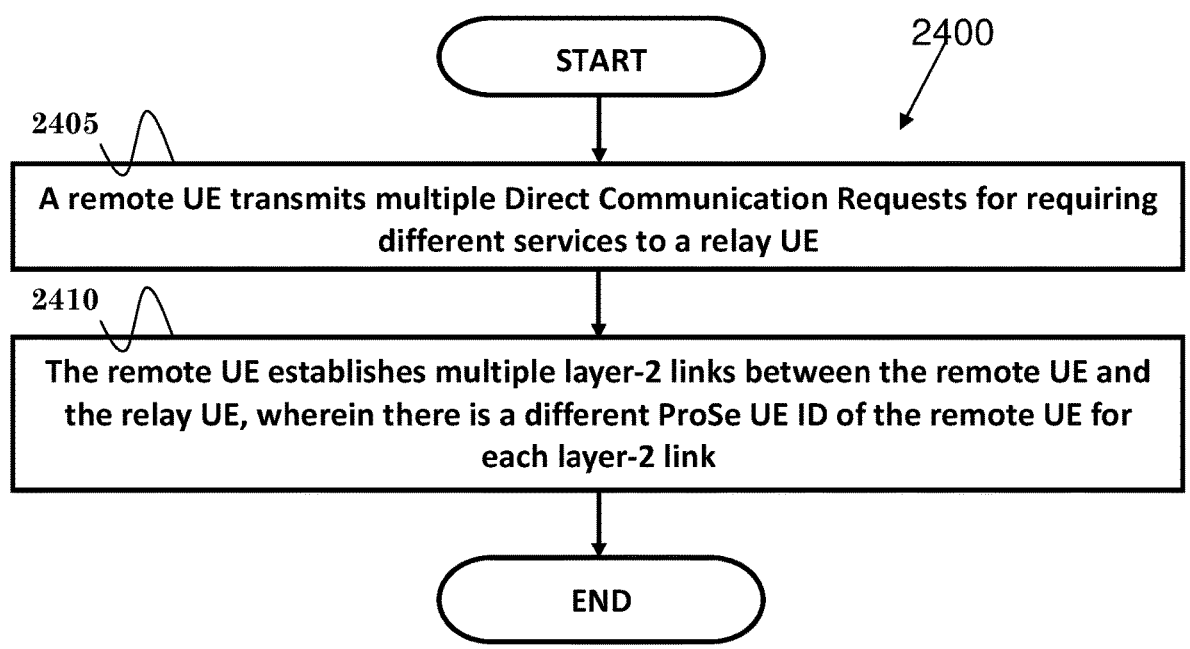
FIG. 24 is a flow chart according to one exemplary embodiment.

FIG. 24 is a flow chart 2400 according to one exemplary embodiment. In step 2405, a remote UE transmits multiple Direct Communication Requests for requiring different services to a relay UE. Each layer-2 link is associated with one service or one PDN connection. In one embodiment, a destination of the Direct Communication Request could be a ProSe Relay UE ID of the relay UE, wherein the ProSe Relay UE ID is selected based on the required service.

In step 2410, the remote UE establishes multiple layer-2 links between the remote UE and the relay UE, wherein there is a different ProSe UE ID of the remote UE for each layer-2 link. In one embodiment, the remote UE establishes each of the multiple layer-2 links for communicating with one PDN through the relay UE. Furthermore, the different ProSe UE ID for each layer-2 link could be allocated by a PDN. The different ProSe UE ID for each layer-2 link could also be allocated in authorization procedure. In addition, the different ProSe UE ID for each layer-2 link could be selected by the remote UE. Furthermore, the different ProSe UE ID for each layer-2 link could be derived by negotiation between the remote UE and the relay UE.

Referring back to FIGS. 3 and 4, in one exemplary embodiment from the perspective of a remote UE, the device 300 includes a program code 312 stored in the memory 310. The CPU 308 could execute program code 312 to enable the remote UE (i) to transmit multiple Direct Communication Requests for requiring different services to a relay UE, and (ii) to establish multiple layer-2 links between the remote UE and the relay UE, wherein there is a different ProSe UE ID of the remote UE for each layer-2 link. Furthermore, the CPU 308 can execute the program code 312 to perform all of the above-described actions and steps or others described herein.

Alternative 2 for Direction 2—

Figure 25:
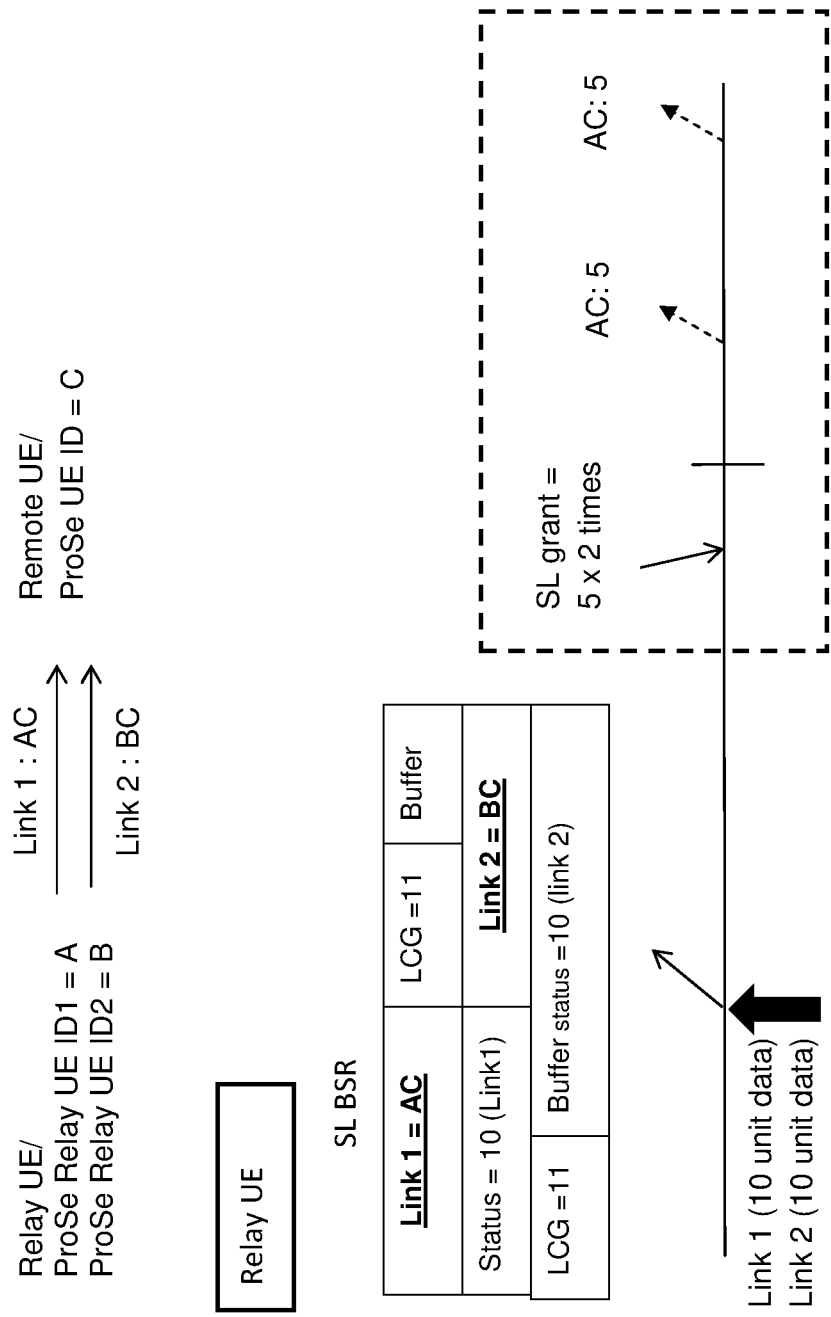
FIG. 25 is a diagram according to one exemplary embodiment.

FIG. 25 illustrates an example of applying Alternative 2 for Direction 2. In this alternative, a Relay UE reports buffer status in per source/destination combination. To do so, the Relay UE may separately include different source/destination combinations into the destinationInfoList of a SidelinkUEInformation, instead of destination. In this way, the buffer size field in a SL BSR will only be associated with one source/destination combination. In one embodiment, the Relay UE may repeatedly include the same destination into destinationInfoList multiple times for representing multiple source/destination combinations.

Figure 26:
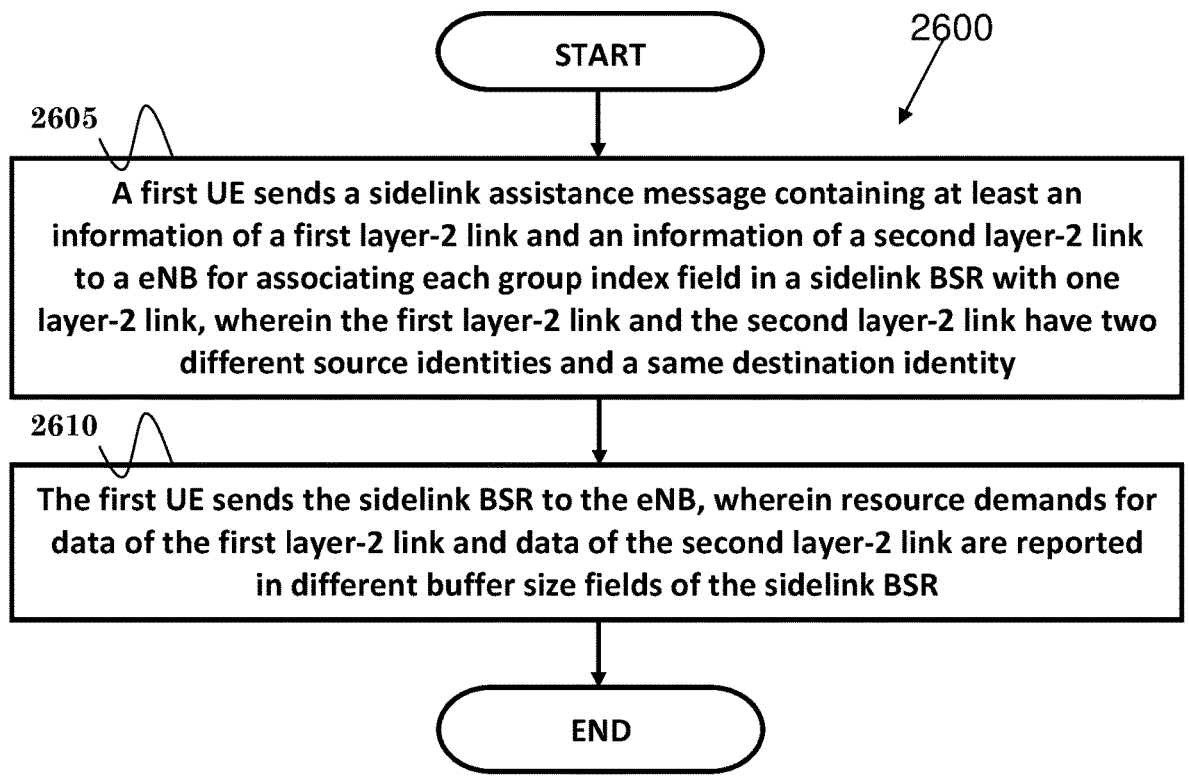
FIG. 26 is a flow chart according to one exemplary embodiment.

FIG. 26 is a flow chart 2600 according to one exemplary embodiment. In step 2605, a first UE sends a sidelink assistance message containing at least an information of a first layer-2 link and an information of a second layer-2 link to an eNB for associating each group index field in a sidelink BSR with one layer-2 link, wherein the first layer-2 link and the second layer-2 link have two different source identities and a same destination identity. The first layer-2 link and the second layer-2 link are established between the first UE and a second UE.

In one embodiment, the sidelink assistance message is a SidelinkUEInformation. Furthermore, the sidelink assistance message includes the destination identity twice, once in the information of the first layer-2 link and once in the information of the second layer-2 link. In addition, the information of the first layer-2 link could include a first ProSe Relay UE ID of the first UE and the destination identity, and the information of the second layer-2 link includes a second ProSe Relay UE ID of the first UE and the destination identity. Alternatively, the information of the first layer-2 link could include only the destination identity, and the information of the second layer-2 link could also include only the destination identity. The destination identity could be a ProSe UE ID of the second UE. Also, the information of the first layer-2 link and information of the second layer-2 link could be contained or included in a destinationInfoList IE (Information Element).

In one embodiment, the first ProSe Relay UE ID is different from the second ProSe Relay UE ID. Furthermore, the first ProSe Relay UE ID and the second ProSe Relay UE ID are related to different PDNs.

In step 2610, the first UE sends the sidelink BSR to the eNB, wherein resource demands for data of the first layer-2 link and data of the second layer-2 link are reported in different buffer size fields of the sidelink BSR. In one embodiment, the first UE could be a relay UE, and the second UE could be a remote UE.

Referring back to FIGS. 3 and 4, in one exemplary embodiment from the perspective of a first UE, the device 300 includes a program code 312 stored in the memory 310. The CPU 308 could execute program code 312 to enable the first UE (i) to send a sidelink assistance message containing at least an information of a first layer-2 link and an information of a second layer-2 link to an eNB for associating each group index field in a sidelink BSR with one layer-2 link, wherein the first layer-2 link and the second layer-2 link established between the relay UE and a remote UE have two different source identities and a same destination identity, and (ii) to send the sidelink BSR to the eNB, wherein resource demands for data of the first layer-2 link and data of the second layer-2 link are reported in different buffer size fields of the sidelink BSR. Furthermore, the CPU 308 can execute the program code 312 to perform all of the above-described actions and steps or others described herein.

Alternative 3 for Direction 2—

Figure 27:
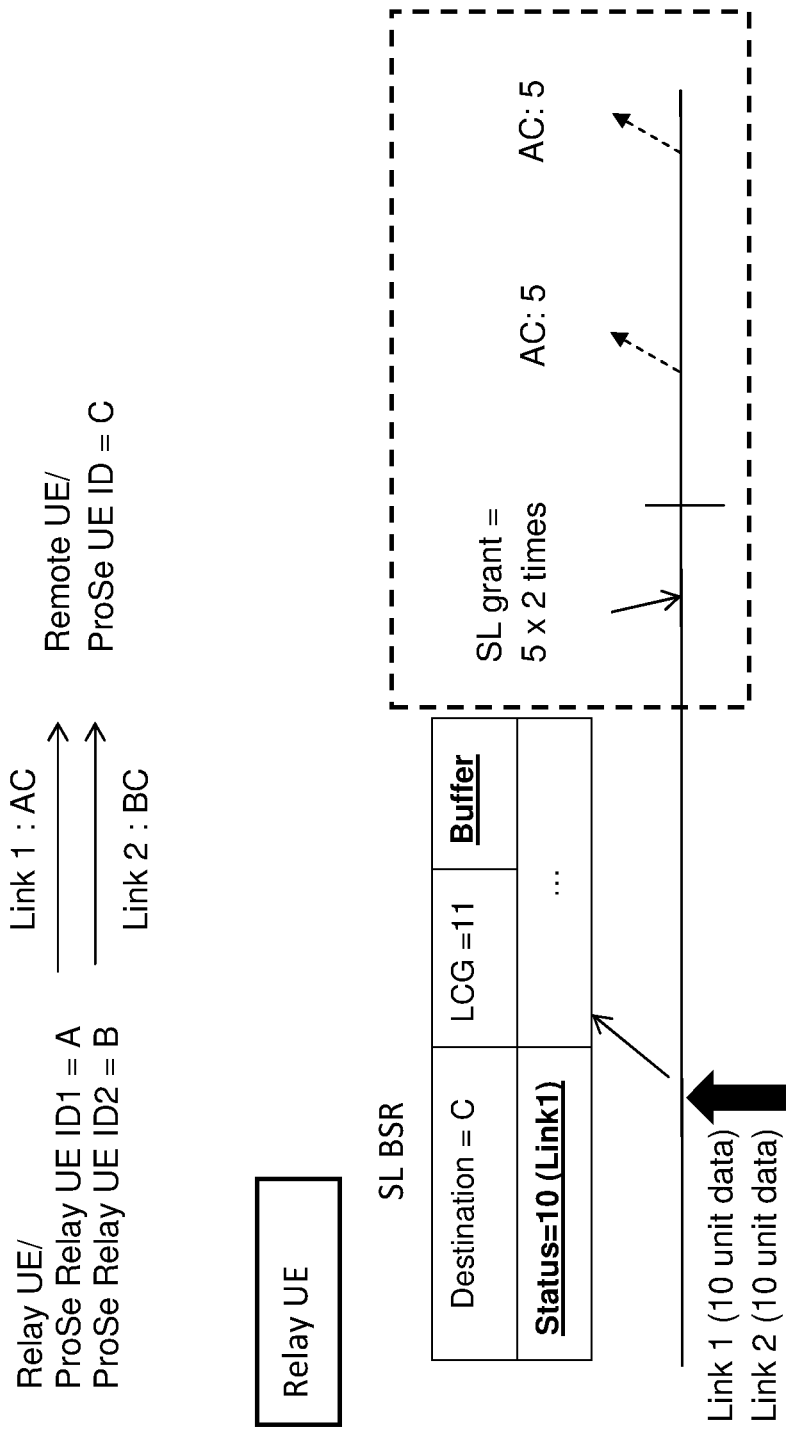
FIG. 27 is a diagram according to one exemplary embodiment.

FIG. 27 illustrates an example of applying Alternative 3 for Direction 2. If the Relay UE has multiple source/destination combinations which have data available for transmission and direct to the same destination, the Relay UE would select one of those source/destination combinations instead of taking all of those source/destination combinations into account when the Relay UE needs to report buffer status of the destination through a SL BSR. More specifically, the Relay UE may select one of the source/destination combinations which are associated with the same destination for reflecting the corresponding buffer status in the SL BSR based on comparing priority of the highest priority of data available for transmission of each source/destination combination.

Figure 28:
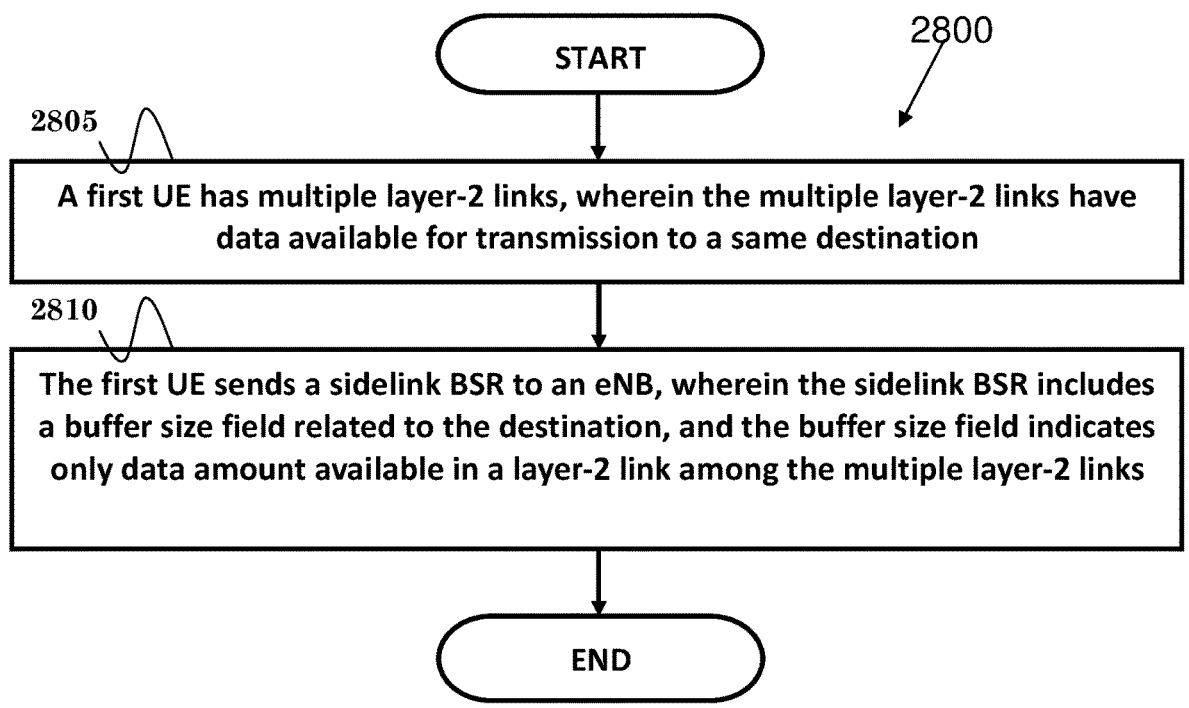
FIG. 28 is a flow chart according to one exemplary embodiment.

FIG. 28 is a flow chart 2800 according to one exemplary embodiment. In step 2805, a first UE has multiple layer-2 links, wherein the multiple layer-2 links have data available for transmission to a same destination.

In step 2810, the first UE sends a sidelink BSR to an eNB, wherein the sidelink BSR includes a buffer size field related to the destination, and the buffer size field indicates only data amount available in a layer-2 link among the multiple layer-2 links. In one embodiment, the first UE determines and sets the data amount available for the layer-2 link in the buffer size field because the data available for transmission of the layer-2 link has the highest priority. In addition, the first UE could be a relay UE and the second UE could be a remote UE. Furthermore, the destination could be a ProSe UE ID of the second UE.

Referring back to FIGS. 3 and 4, in one exemplary embodiment from the perspective of a first UE, the device 300 includes a program code 312 stored in the memory 310. The CPU 308 could execute program code 312 to enable the first UE (i) to have multiple layer-2 links, wherein the multiple layer-2 links have data available for transmission to a same destination, and (ii) to send a sidelink BSR to an eNB, wherein the sidelink BSR includes a destination field and a buffer size field related to the destination, and the buffer size field indicates only data amount available in a layer-2 link among the multiple layer-2 links. Furthermore, the CPU 308 can execute the program code 312 to perform all of the above-described actions and steps or others described herein.

Alternative 4 for Direction 2—

Figure 29:
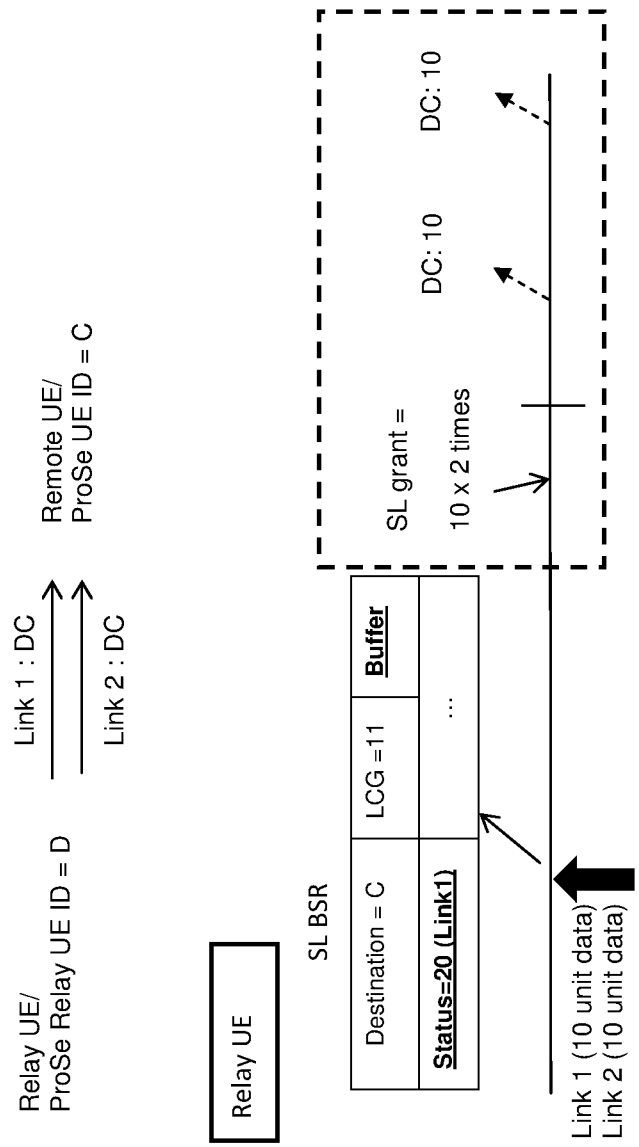
FIG. 29 is a diagram according to one exemplary embodiment.

FIG. 29 illustrates an example of applying Alternative 4 for Direction 2. In this alternative, a Relay UE uses one ProSe Relay UE ID for all relay communications with a Remote UE. Based on such usage, the communications for different PDN connections between the Relay UE and the Remote UE could be aligned in one source/destination combination. Other means may be used for the receiving side to distinguish which MAC SDU belongs to which PDN connection.

In one embodiment, a field in the sub-header of each MAC SDU may indicate the associated PDN connection. For example, such field could be a logical channel identity field if different PDN connections use different (sets of) logical channels and the association between PDN connections and logical channels are known to both the Remote UE and the Relay UE based on a negotiation between the Relay UE and the Remote UE or a predefinition. Moreover, the Relay UE may use the ProSe Relay UE ID for all relay communications with any Remote UE.

Figure 30:
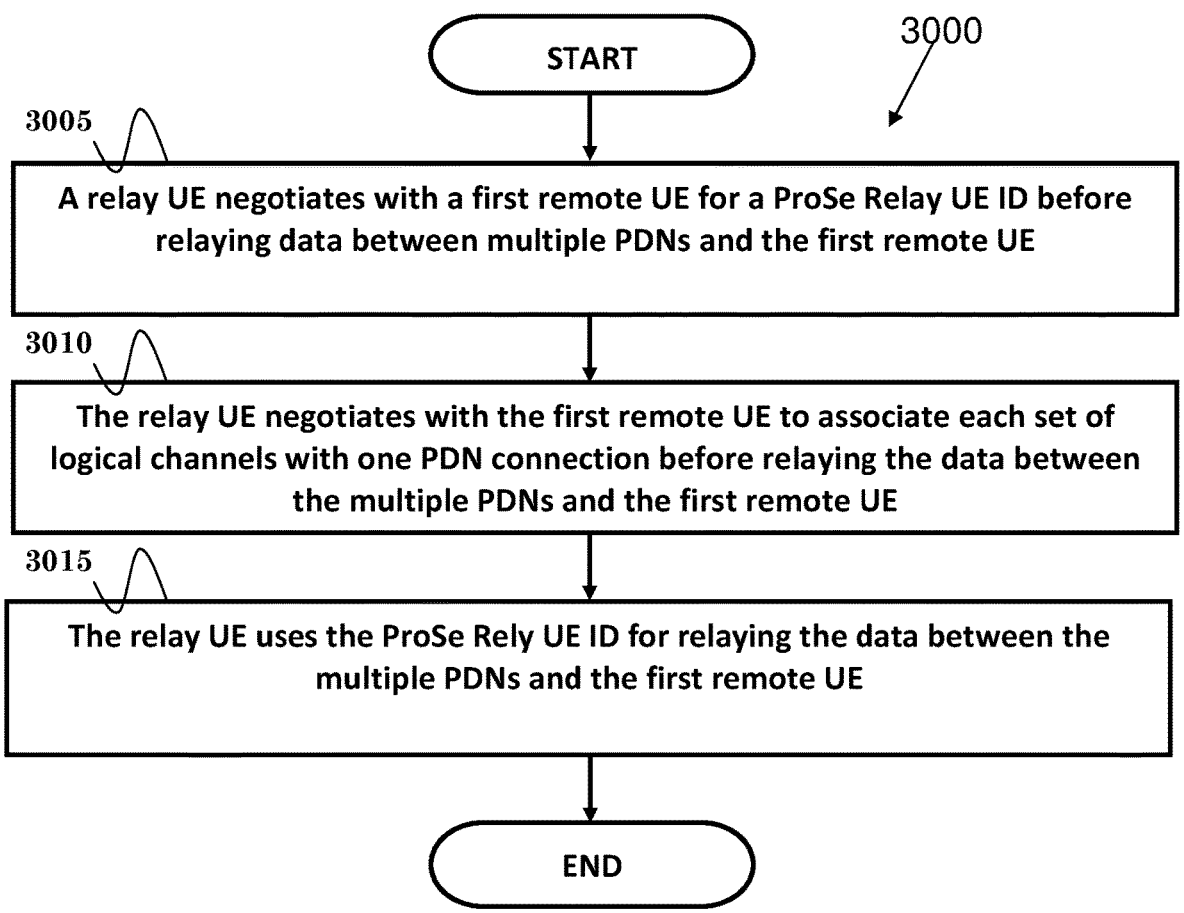
FIG. 30 is a flow chart according to one exemplary embodiment.

FIG. 30 is a flow chart 3000 according to one exemplary embodiment. In step 3005, a relay UE negotiates with a first remote UE for a ProSe Relay UE ID before relaying data between multiple PDNs and the first remote UE. In step 3010, the relay UE negotiates with the first remote UE to associate each set of logical channels with one PDN connection before relaying the data between the multiple PDNs and the first remote UE. In step 3015, the relay UE uses the ProSe Relay UE ID for relaying the data between the multiple PDNs and the first remote UE.

In one embodiment, the ProSe Relay UE ID could be allocated by network. Alternatively, the ProSe Relay UE ID could be created/selected/determined by the relay UE.

In one embodiment, the relay UE has one layer-2 link for the first remote UE regardless of number of PDN connections required by the first remote UE. In addition, the relay UE may use another ProSe Relay UE ID which is different from the ProSe Relay UE ID used for the first remote UE for relaying data between a PDN and a second remote UE.

In one embodiment, the PDN connection could be established between the relay UE and a PDN gateway (PDN GW).

Referring back to FIGS. 3 and 4, in one exemplary embodiment from the perspective of a relay UE, the device 300 includes a program code 312 stored in the memory 310. The CPU 308 could execute program code 312 to enable the relay UE (i) to negotiate with a first remote UE for a ProSe Relay UE ID before relaying data between multiple PDNs and the first remote UE, (ii) to negotiate with the first remote UE to associate each set of logical channels with one PDN connection before relaying the data between the multiple PDNs and the first remote UE, and (iii) to use the ProSe Relay UE ID for relaying the data between the multiple PDNs and the first remote UE. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for solving mismatch between sidelink BSR (Buffer Status Report) and available sidelink transmission, comprising:
   a relay UE (User Equipment) establishes a first layer-2 link and a second layer-2 link between the relay UE and a remote UE, wherein each layer-2 link is identified by a source/destination pair and wherein the first layer-2 link and the second layer-2 link have two different source identities and a same destination identity;
   the relay UE receives a sidelink grant from an eNB (evolved Node B); and
   the relay UE uses the sidelink grant to serve the first layer-2 link and the second layer-2 link, wherein the relay UE transmits a first sidelink MAC (Medium Access Control) SDU (Service Data Unit) or PDU (Protocol Data Unit) of the first layer-2 link and a second sidelink MAC SDU or PDU of the second layer-2 link to the remote UE based on the sidelink grant.

2. The method of claim 1, wherein the first sidelink MAC PDU and the second sidelink MAC PDU are transmitted on different subframes.

3. The method of claim 1, wherein the first sidelink MAC SDU of the first layer-2 link and the second sidelink MAC SDU of the second layer-2 link are included in a sidelink MAC PDU for transmission and the sidelink MAC PDU has a first option containing the first sidelink MAC SDU and a second portion containing the second sidelink MAC SDU.

4. The method of claim 2, wherein the sidelink grant maps to a set of subframes, and the subframe on which the first sidelink MAC PDU is transmitted and the subframe on which the second sidelink MAC PDU is transmitted belong to the set of subframes.

5. The method of claim 2, wherein a value of source field in the first sidelink MAC PDU is a first ProSe (Proximity-based Service) Relay UE ID (Identity) of the relay UE and a value of source field in the second sidelink MAC PDU is a second ProSe Relay UE ID of the relay UE, and the first ProSe Relay UE ID is different from the second ProSe Relay UE ID.

6. The method of claim 5, wherein a value of destination field in the first sidelink MAC PDU and a value of destination field in the second sidelink MAC PDU are a ProSe (Proximity-based Service) UE ID (Identity) of the remote UE.

7. The method of claim 3, wherein a first field in a SL-SCH (Sidelink Shared Channel) sub-header of the first portion indicates that the second portion exists, and a second field in the SL-SCH sub-header of the first portion indicates number of MAC SDU in the first portion.

8. A method for solving mismatch between sidelink BSR (Buffer Status Report) and available sidelink transmission, comprising:
   a relay UE sends a sidelink assistance message containing at least an information of a first layer-2 link and an information of a second layer-2 link to an eNB (evolved Node B) in a destination information list for associating each group index field in a sidelink BSR with one layer-2 link, wherein the information of the first layer-2 link includes a ProSe (Proximity-based Service) UE ID (Identity) of the remote UE and the information of the second layer-2 link includes the ProSe UE ID of the remote UE, wherein each layer-2 link is identified by a source/destination pair and wherein the first layer-2 link and the second layer-2 link established between the relay UE and a remote UE have two different source identities and a same destination identity; and
   the relay UE sends the sidelink BSR to the eNB, wherein resource demands for data of the first layer-2 link and data of the second layer-2 link are reported in different buffer size fields of the sidelink BSR.

9. The method of claim 8, wherein the first layer-2 link is identified by a combination of a first ProSe Relay UE ID of the relay UE and the ProSe UE ID of the remote UE, and the second layer-2 link is identified by a combination of a second ProSe Relay UE ID of the relay UE and the ProSe UE ID of the remote UE, and the first ProSe Relay UE ID is different from the second ProSe Relay UE ID.

10. A relay user equipment (UE) for solving mismatch between sidelink BSR (Buffer Status Report) and available sidelink transmission, comprising:
    a control circuit;
    a processor installed in the control circuit; and
    a memory installed in the control circuit and operatively coupled to the processor;
    wherein the processor is configured to execute a program code stored in the memory to enable a relay UE (User Equipment) to:
       establish a first layer-2 link and a second layer-2 link between the relay UE and a remote UE, wherein each layer-2 link is identified by a source/destination pair and wherein the first layer-2 link and the second layer-2 link have two different source identities and a same destination identity;
       receive a sidelink grant from an eNB (evolved Node B); and
       use the sidelink grant to serve the first layer-2 link and the second layer-2 link wherein the relay UE transmits a first sidelink MAC (Medium Access Control) SDU (Service Data Unit) or PDU (Protocol Data Unit) of the first layer-2 link and a second sidelink MAC SDU or PDU of the second layer-2 link to the remote UE based on the sidelink grant.

11. The relay UE of claim 10, wherein the first sidelink MAC PDU and the second sidelink MAC PDU are transmitted on different subframes.

12. The relay UE of claim 10, wherein the first sidelink MAC SDU of the first layer-2 link and the second sidelink MAC SDU of the second layer-2 link are included in a sidelink MAC PDU for transmission and the sidelink MAC PDU has a first option containing the first sidelink MAC SDU and a second portion containing the second sidelink MAC SDU.

13. The relay UE of claim 11, wherein the sidelink grant maps to a set of subframes, and the subframe on which the first sidelink MAC PDU is transmitted and the subframe on which the second sidelink MAC PDU is transmitted belong to the set of subframes.

14. The relay UE of claim 11, wherein a value of source field in the first sidelink MAC PDU is a first ProSe (Proximity-based Service) Relay UE ID (Identity) of the relay UE and a value of source field in the second sidelink MAC PDU is a second ProSe Relay UE ID of the relay UE, and the first ProSe Relay UE ID is different from the second ProSe Relay UE ID.

15. The relay UE of claim 14, wherein a value of destination field in the first sidelink MAC PDU and a value of destination field in the second sidelink MAC PDU are a ProSe (Proximity-based Service) UE ID (Identity) of the remote UE.

16. The relay UE of claim 12, wherein a first field in a SL-SCH (Sidelink Shared Channel) sub-header of the first portion indicates that the second portion exists, and a second field in the SL-SCH sub-header of the first portion indicates number of MAC SDU in the first portion.

17. A relay user equipment (UE) for solving mismatch between sidelink BSR (Buffer Status Report) and available sidelink transmission, comprising:
    a control circuit;
    a processor installed in the control circuit; and
    a memory installed in the control circuit and operatively coupled to the processor;
    wherein the processor is configured to execute a program code stored in the memory to enable a relay UE (User Equipment) to:
        send a sidelink assistance message containing at least an information of a first layer-2 link and an information of a second layer-2 link to an eNB (evolved Node B) in a destination information list for associating each group index field in a sidelink BSR with one layer-2 link, wherein the information of the first layer-2 link includes a ProSe (Proximity-based Service) UE ID (Identity) of the remote UE and the information of the second layer-2 link includes the ProSe UE ID of the remote UE, wherein each layer-2 link is identified by a source/destination pair and wherein the first layer-2 link and the second layer-2 link established between the relay UE and a remote UE have two different source identities and a same destination identity; and
        send the sidelink BSR to the eNB, wherein resource demands for data of the first layer-2 link and data of the second layer-2 link are reported in different buffer size fields of the sidelink BSR.

18. The relay UE of claim 17, wherein the first layer-2 link is identified by a combination of a first ProSe Relay UE ID of the relay UE and the ProSe UE ID of the remote UE, and the second layer-2 link is identified by a combination of a second ProSe Relay UE ID of the relay UE and the ProSe UE ID of the remote UE, and the first ProSe Relay UE ID is different from the second ProSe Relay UE ID.

* * * * *